US012376025B2

(12) United States Patent
Salkintzis et al.

(10) Patent No.: US 12,376,025 B2
(45) **Date of Patent: *Jul. 29, 2025**

(54) ACCESS NETWORK SELECTION FOR A UE NOT SUPPORTING NAS OVER NON-3GPP ACCESS

(71) Applicant: Lenovo (Singapore) Pte. Ltd., New Tech Park (SG)

(72) Inventors: Apostolis Salkintzis, Athens (GR); Dimitrios Karampatsis, Ruislip (GB); Genadi Velev, Darmstadt (DE)

(73) Assignee: Lenovo (Singapore) Pte. Ltd., Singapore (SG)

( * ) Notice: Subject to any disclaimer, the term of this patent is extended or adjusted under 35 U.S.C. 154(b) by 142 days.

This patent is subject to a terminal disclaimer.

(21) Appl. No.: 18/306,143

(22) Filed: Apr. 24, 2023

(65) Prior Publication Data

US 2023/0262593 A1 Aug. 17, 2023

Related U.S. Application Data

(63) Continuation of application No. 17/279,059, filed as application No. PCT/EP2018/081612 on Nov. 16, 2018, now Pat. No. 11,638,208.

(51) Int. Cl.
*H04W 48/18* (2009.01)
*H04W 76/10* (2018.01)

(52) U.S. Cl.
CPC .......... *H04W 48/18* (2013.01); *H04W 76/10* (2018.02)

(58) Field of Classification Search
CPC ..... H04W 48/18; H04W 76/10; H04W 88/06; H04W 60/00; H04W 84/042; H04W 48/16; H04W 60/005
See application file for complete search history.

(56) References Cited

U.S. PATENT DOCUMENTS

2018/0317157 A1 11/2018 Baek et al.
2020/0280843 A1 9/2020 Foti et al.

FOREIGN PATENT DOCUMENTS

WO 2018/065052 A1 4/2018

OTHER PUBLICATIONS

Motorola Mobility, Lenovo, Broadcom, "Conclusions about UEs not supporting NAS over WLAN access", 3GPP SA WG2 Meeting #129bis S2-1812585, Nov. 26-30, 2018, pp. 1-13.

(Continued)

*Primary Examiner* — Marcus Hammonds
(74) *Attorney, Agent, or Firm* — Kunzler Bean & Adamson

(57) ABSTRACT

Apparatuses, methods, and systems are disclosed for access network selection for UEs not supporting the Non-Access Stratum ("NAS") protocol over non-3GPP access. One method includes creating a first list of available PLMNs, each PLMN connectable via a non-3GPP access network using a 5G connectivity without the NAS protocol. The method includes selecting a first PLMN from the first list and creating a second list of available non-3GPP access networks. The method includes selecting a first non-3GPP access network from the second list and beginning a connectivity procedure over the first non-3GPP access network, where the connectivity procedure creates a data connection for the apparatus via the first PLMN, and where the connectivity procedure does not use the NAS protocol.

20 Claims, 11 Drawing Sheets

(56) References Cited

OTHER PUBLICATIONS

3GPP, "3rd Generation Partnership Project; Technical Specification Group Services and System Aspects; Architecture enhancements for non-3GPP accesses (Release 16)", 3GPP TS 23.402 V16.0.0, Jun. 2019, pp. 1-314.
3GPP, "3rd Generation Partnership Project; Technical Specification Group Services and System Aspects; System architecture for the 5G System (5GS); Stage 2 (Release 16)", 3GPP TS 23.501 V16.7.0, Dec. 2020, pp. 1-450.
3GPP, "3rd Generation Partnership Project; Technical Specification Group Services and System Aspects; Procedures for the 5G System (5GS); Stage 2 (Release 16)", 3GPP TS 23.502 V16.7.1, Jan. 2021, pp. 1-603.
3GPP, "3rd Generation Partnership Project; Technical Specification Group Services and System Aspects; Study on the Wireless and Wireline Convergence for the 5G system architecture (Release 16)", 3GPP TR 23.716 V16.0.0, Dec. 2018, pp. 1-184.
3GPP, "3rd Generation Partnership Project; Technical Specification Group Core Network and Terminals; Access to the 3GPP Evolved Packet Core (EPC) via non-3GPP access networks; Stage 3 (Release 17)", 3GPP TS 24.302 V, Dec. 2020, pp. 1-177.
Motorola Mobility, Lenovo, "Solution for Key Issue #3: Access to 5GC from UEs that do not support NAS", 3GPP SA WG2 Meeting #127-bis S2-185617, May 28-Jun. 1, 2018, pp. 1-5.
Motorola Mobility, Lenovo, Broadcom, "Update of Solution #3: Access to 5GC from UEs without supporting NAS on non-3GPP access", 3GPP SA WG2 Meeting #128-bis S2-188617, Aug. 20-24, 2018, pp. 1-8.
Motorola Mobility, Lenovo, "Access Network Selection for UEs not supporting NAS over non-3GPP access", 3GPP SA WG2 Meeting #129bis S2-1811836, Nov. 26-30, 2018, pp. 1-5.

List of Available non-3GPP Access Networks 260

| Non-3GPP AN ID | Supported PLMN | Connectivity Type(s) |
|---|---|---|
| SSID=x1 | PLMN-a | S2a Connectivity, 5G Connectivity, 5G Connectivity-w/o-NAS |
| SSID=x1 | PLMN-b | S2a Connectivity |
| SSID=x2 | PLMN-b | S2a Connectivity |
| SSID=x2 | PLMN-c | S2a Connectivity |
| SSID=x2 | PLMN-d | 5G Connectivity-w/o-NAS |
| SSID=x3 | PLMN-d | 5G Connectivity, 5G Connectivity-w/o-NAS |

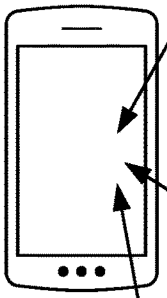

UE
205

List of available PLMNs connectable via non-3GPP access without using NAS 270

| |
|---|
| PLMN-a |
| PLMN-d |

List of Available PLMNs 265

| Available PLMN | Connectivity Type(s) |
|---|---|
| PLMN-a | S2a Connectivity, 5G Connectivity, 5G Connectivity-w/o-NAS |
| PLMN-b | S2a Connectivity |
| PLMN-c | S2a Connectivity |
| PLMN-d | 5G Connectivity, 5G Connectivity-w/o-NAS |

FIG. 2B

ACCESS NETWORK SELECTION FOR A UE NOT SUPPORTING NAS OVER NON-3GPP ACCESS

FIELD

The subject matter disclosed herein relates generally to wireless communications and more particularly relates to access network selection for a user equipment ("UE") not supporting the Non-Access Stratum ("NAS") protocol over non-Third Generation Partnership Project ("non-3GPP") access.

BACKGROUND

In fifth generation ("5G") wireless communication systems, a non-3GPP access network (notably, a Wireless Local Area Network ("WLAN")) may support interfaces with mobile networks (e.g., Public Land Mobile Networks ("PLMNs")) in order to enable wireless devices (e.g., UEs) to connect to these mobile networks and utilize their services. For example, a WLAN access network may support the N2 interface and the N3 interface (i.e., core network interfaces defined by the Third Generation Partnership Project ("3GPP")) with a PLMN for connecting wireless devices to the 5G core ("5GC") network in this PLMN via WLAN access. However, not every UE supports the NAS protocol over non-3GPP access.

BRIEF SUMMARY

Techniques for access network selection for UEs not supporting the NAS protocol over non-3GPP access are disclosed. Said techniques may be implemented by methods, apparatuses, and/or systems.

One method (e.g., performed by a UE) for access network selection for UEs not supporting the NAS protocol over non-3GPP access includes creating, at a remote unit, a first list of available PLMNs, each public land mobile network ("PLMN") connectable via a non-3GPP access network using a 5G connectivity without the NAS protocol. The method includes selecting, by the remote unit, a first PLMN from the first list and creating, at a remote unit, a second list of available non-3GPP access networks. The method includes selecting, by the remote unit, a first non-3GPP access network from the second list and beginning, by the remote unit, a connectivity procedure over the first non-3GPP access network, where the connectivity procedure creates a data connection for the remote unit via the first PLMN, and where the connectivity procedure does not use the NAS protocol.

Another method (e.g., performed by a non-3GPP access point) for access network selection for UEs not supporting the NAS protocol over non-3GPP access includes receiving, from one or more interworking functions, a set of PLMNs for which connectivity is supported without using the NAS protocol. Here, the one or more interworking functions provide access to one or more PLMNs. The method includes receiving, for each PLMN in the set, a list of one or more supported network slices, a network slice being identified by a single network slice selection assistance information ("S-NSSAI"). The method includes receiving, from a first remote unit, a connection request message, the connection request message indicating a first PLMN from the set and a first S-NSSAI. The method includes forwarding the connection request message to a first interworking function.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 2B illustrates one example of network lists that supports techniques for access network selection for UEs not supporting the NAS protocol over non-3GPP access in accordance with aspects of the present disclosure;

DETAILED DESCRIPTION

Methods, apparatuses, and systems are disclosed for access network selection for UEs not supporting the NAS protocol over non-3GPP access. As mentioned above, a non-3GPP access network (e.g., a WLAN) may support interfaces with mobile networks (e.g., one or more PLMNs) in order to enable wireless devices to connect to these mobile networks and utilize their services. Note that 5GC networks support the NAS protocol for access control, connection management and session management. Thus, all UEs must support the NAS protocol in order to connect to 5GC, either via 3GPP access (e.g., next-generation radio access network ("NG-RAN")), or via non-3GPP access (e.g. WLAN). The N1 interfaces in 5G carry NAS messages between the UE and 5GC. However, there is currently a large number of UEs (including laptops, IoT devices, etc.) which do not support the NAS protocol over non-3GPP access, but they may want to establish connectivity via 5GC.

When a wireless device wants to establish a data connection via a 5GC via a non-3GPP access network, but does not support the NAS protocol over non-3GPP access, the wireless device requires a method for selecting (a) the PLMN to connect to via non-3GPP access, (b) a slice type (an S-NSSAI) to use in the selected PLMN, and (c) a non-3GPP access network that can provide connectivity to the selected PLMN and to the selected slice type.

Figure 1:
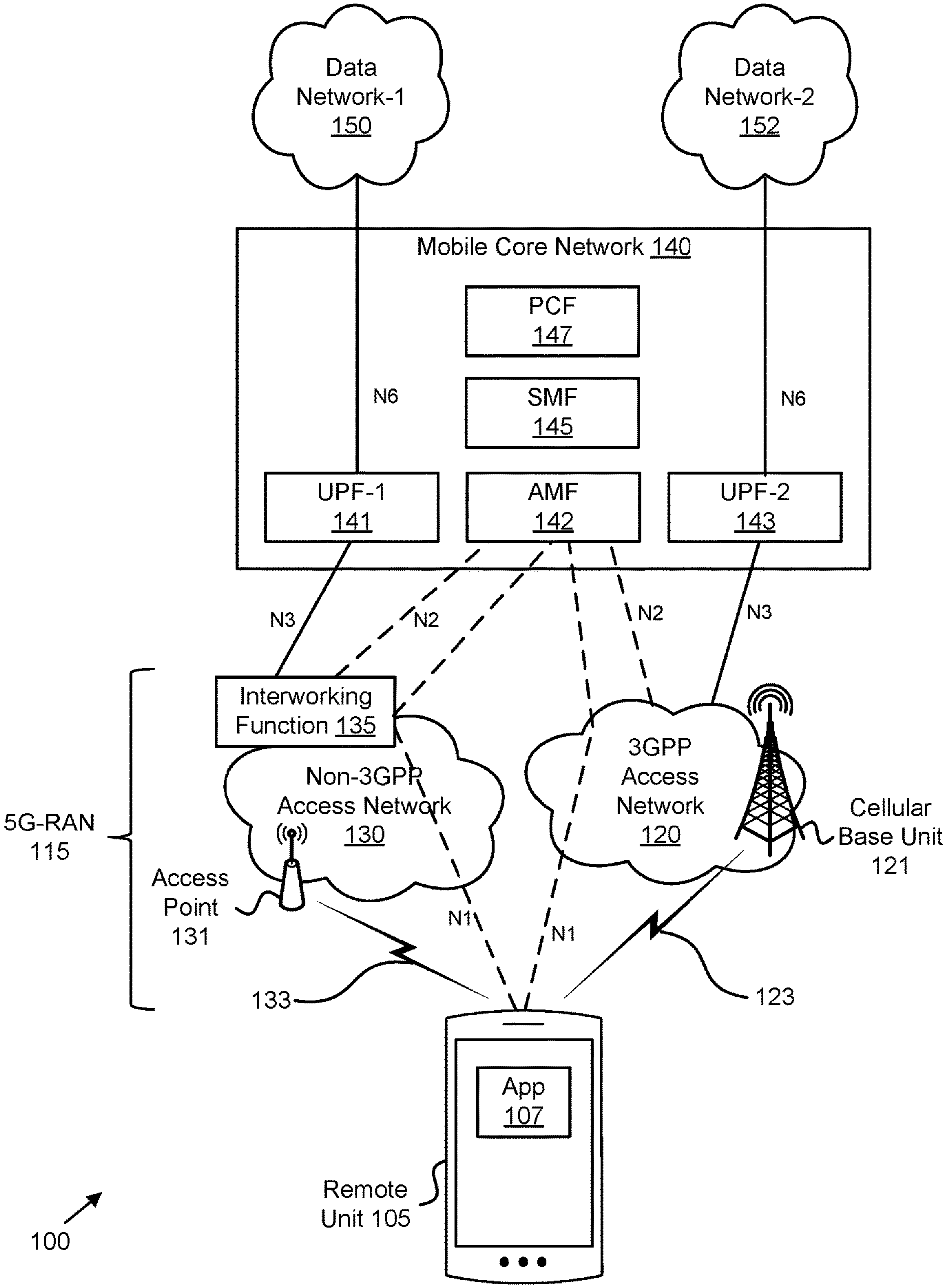
FIG. 1 illustrates one example of a wireless communication system that supports techniques for access network selection for UEs not supporting the NAS protocol over non-3GPP access in accordance with aspects of the present disclosure.

FIG. 1 illustrates an example of a wireless communication system 100 that supports techniques for access network selection for UEs not supporting the NAS protocol over non-3GPP access, in accordance with aspects of the present disclosure. In one embodiment, the wireless communication system 100 includes at least one remote unit 105, a 5G radio access network ("5G-RAN") 115, and a mobile core network 140. The 5G-RAN 115 and the mobile core network form a mobile communication network. The 5G-RAN 115 may be composed of a 3GPP access network 120 containing at least one cellular base station unit 121 and/or a non-3GPP access network 130 containing at least one access point 131. The remote unit communicates with the 3GPP access network 120 using 3GPP communication links 123 and communicates with the non-3GPP access network 130 using non-3GPP communication links 133. Even though a specific number of remote units 105, 3GPP access networks 120, cellular base station units 121, 3GPP communication links 123, non-3GPP access networks 130, access points 131, non-3GPP communication links 133, and mobile core networks 140 are depicted in FIG. 1, one of skill in the art will recognize that any number of remote units 105, 3GPP access networks 120, cellular base station units 121, 3GPP communication links 123, non-3GPP access networks 130, access points 131, non-3GPP communication links 133, and mobile core networks 140 may be included in the wireless communication system 100.

In one implementation, the wireless communication system 100 is compliant with the 5G system specified in the 3GPP specifications. More generally, however, the wireless communication system 100 may implement some other open or proprietary communication network, for example, Long-Term Evolution ("LTE") or Worldwide Interoperability for Microwave Access ("WiMAX"), among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as UEs, subscriber units, mobiles, mobile stations, users, terminals, mobile terminals, fixed terminals, subscriber stations, user terminals, wireless transmit/receive unit ("WTRU"), a device, or by other terminology used in the art.

The remote units 105 may communicate directly with one or more of the cellular base station units 121 in the 3GPP access network 120 via uplink ("UL") and downlink ("DL") communication signals. Furthermore, the UL and DL communication signals may be carried over the 3GPP communication links 123. Similarly, the remote units 105 may communicate with one or more access points 131 in the non-3GPP access network(s) 130 via UL and DL communication signals carried over the non-3GPP communication links 133. Here, the access networks 120 and 130 are intermediate networks that provide the remote units 105 with access to the mobile core network 140.

In some embodiments, the remote units 105 communicate with a remote host via a network connection with the mobile core network 140. For example, an application 107 (e.g., web browser, media client, telephone/Voice-over-Internet-Protocol ("VoIP") application) in a remote unit 105 may trigger the remote unit 105 to establish a Protocol Data Unit ("PDU") session (or other data connection) with the mobile core network 140 using the 5G-RAN 115 (e.g., a 3GPP access network 120 and/or a non-3GPP access network 130). The mobile core network 140 then relays traffic between the remote unit 105 and either the first data network 150 or the second data network 152 using the PDU session. Note that the remote unit 105 may establish one or more PDU sessions (or other data connections) with the mobile core network 140. As such, the remote unit 105 may have at least one PDU session for communicating with the first data network 150 and at least one PDU session for communicating with the second data network 152.

The cellular base station units 121 may be distributed over a geographic region. In certain embodiments, a cellular base station unit 121 may also be referred to as an access terminal, a base, a base unit, a base station, a Node-B, an eNB, a gNB, a Home Node-B, a relay node, a device, or by any other terminology used in the art. The cellular base station units 121 are generally part of a radio access network ("RAN"), such as the 3GPP access network 120, that may include one or more controllers communicably coupled to one or more corresponding cellular base station units 121. These and other elements of radio access network are not illustrated but are well known generally by those having ordinary skill in the art. The cellular base station units 121 connect to the mobile core network 140 via the 3GPP access network 120.

The cellular base station units 121 may serve a number of remote units 105 within a serving area, for example, a cell or a cell sector, via a 3GPP communication link 123. The cellular base station units 121 may communicate directly with one or more of the remote units 105 via communication signals. Generally, the cellular base station units 121 transmit DL communication signals to serve the remote units 105 in the time, frequency, and/or spatial domain. Furthermore, the DL communication signals may be carried over the 3GPP communication links 123. The 3GPP communication links 123 may be any suitable carrier in licensed or unlicensed radio spectrum. The 3GPP communication links 123 facilitate communication between one or more of the remote units 105 and/or one or more of the cellular base station units 121.

The non-3GPP access networks 130 may be distributed over a geographic region. Each non-3GPP access network 130 may serve a number of remote units 105 with a serving area. Typically, a serving area of the non-3GPP access network 130 is smaller than the serving area of a cellular base station unit 121. An access point 131 in a non-3GPP access network 130 may communicate directly with one or more remote units 105 by receiving UL communication signals and transmitting DL communication signals to serve the remote units 105 in the time, frequency, and/or spatial domain. Both DL and UL communication signals are carried over the non-3GPP communication links 133. The 3GPP communication links 123 and non-3GPP communication links 133 may employ different frequencies and/or different communication protocols. In various embodiments, an access point 131 may communicate using unlicensed radio spectrum. The mobile core network 140 may provide services to a remote unit 105 via the non-3GPP access networks 130, as described in greater detail herein.

In some embodiments, a non-3GPP access network 130 connects to the mobile core network 140 via an interworking function 135. The interworking function 135 provides interworking between the remote unit 105 and the mobile core network 140. Here, the interworking function 135 implements the NAS protocol and exchanges NAS messages with the mobile core network 140 on behalf of the remote unit 105. The interworking function 135 supports connectivity via the "N1" (for NAS message exchange), "N2", and "N3" interfaces. As depicted, both the 3GPP access network 120 and the interworking function 135 communicate with the Access and Mobility Management Function ("AMF") 142 using a "N2" interface. The interworking function 135 also communicates with the first User Plane Function ("UPF") 141 using a "N3" interface, while the 3GPP access network 120 communicates with the second UPF 143 using a "N3" interface.

The non-3GPP access network 130 may support three different types of interworking functions 135. A first type (denoted "Type 1") supports connectivity to one or more 5GC networks for UEs which do not support the NAS protocol. A second type (denoted "Type 2") supports connectivity to one or more 5GC networks for UEs which do support the NAS protocol. A third type (denoted "Type 3") supports connectivity to one or more evolved packet core ("EPC") networks using the existing S2a procedures (see 3GPP Technical Specification ("TS") 23.402). Note that a non-3GPP access network 130 may support one, two, or all three types of interworking functions. The different types of interworking functions are discussed in greater detail below, with reference to FIGS. 2A-2B.

In certain embodiments, a non-3GPP access network 130 may be controlled by an operator of the mobile core network 140 and may have direct access to the mobile core network 140. Such a non-3GPP access network deployment is referred to as a "trusted non-3GPP access network." A non-3GPP access network 130 is considered as "trusted" when it is operated by the 3GPP operator, or a trusted partner, and supports certain security features, such as strong air-interface encryption. In contrast, a non-3GPP access network deployment that is not controlled by an operator (or trusted partner) of the mobile core network 140, does not have direct access to the mobile core network 140, or does not support the certain security features is referred to as a "non-trusted" non-3GPP access network.

In one embodiment, the mobile core network 140 is a 5GC or the EPC, which may be coupled to a data networks 150 and 152, like the Internet and private data networks, among other data networks. A remote unit 105 may have a subscription or other account with the mobile core network 140. Each mobile core network 140 belongs to a single PLMN. The present disclosure is not intended to be limited to the implementation of any particular wireless communication system architecture or protocol.

The mobile core network 140 includes several network functions ("NFs"). As depicted, the mobile core network 140 includes multiple user plane functions ("UPFs"). Here, the mobile core network 140 includes at least a first UPF 141 (denoted "UPF-1") and a second UPF 143 (denoted "UPF-2"). In the depicted embodiment, the first UPF 141 serves the non-3GPP access network 130 and the second UPF 143 serves the 3GPP access network 120. In other embodiments, the first UPF 141 (or second UPF 143) may serve both the 3GPP access network 120 and the non-3GPP access network 130.

The mobile core network 140 also includes multiple control plane functions including, but not limited to, an AMF 142 that serves both the 3GPP access network 120 and the non-3GPP access network 130, a Session Management Function ("SMF") 145, and a Policy Control Function ("PCF") 147. In certain embodiments, the mobile core network 140 may also include an Authentication Server Function ("AUSF"), a Unified Data Management function ("UDM"), a Network Repository Function ("NRF") 146 (used by the various NFs to discover and communicate with each other over Application Programming Interfaces ("APIs")), or other NFs defined for the 5GC.

Although specific numbers and types of network functions are depicted in FIG. 1, one of skill in the art will recognize that any number and type of network functions may be included in the mobile core network 140. Moreover, where the mobile core network 140 is an EPC, the depicted network functions may be replaced with appropriate EPC entities, such as an Mobility Management Entity ("MME"), Serving Gateway ("S-GW"), Packet data network ("PDN") Gateway ("P-GW"), Home Subscriber Server ("HSS"), and the like.

As depicted, a remote unit 105 (e.g., a UE) may connect to the mobile core network (e.g., to a 5G mobile communication network) via two types of accesses: (1) via 3GPP access network 120 and (2) via a non-3GPP access network 130. The first type of access (e.g., 3GPP access network 120) uses a 3GPP-defined type of wireless communication (e.g., NG-RAN) and the second type of access (e.g., non-3GPP access network 130) uses a non-3GPP-defined type of wireless communication (e.g., WLAN). The 5G-RAN 115 refers to any type of 5G access network that can provide access to the mobile core network 140, including the 3GPP access network 120 and the non-3GPP access network 130.

In various embodiments, the mobile core network 140 supports different types of mobile data connections and different types of network slices, wherein each mobile data connection utilizes a specific network slice. The different network slices are not shown in FIG. 1 for ease of illustration, but their support is assumed.

As described in greater detail below, the remote unit 105 may determine to establish a data connection via the mobile core network 140 and via a non-3GPP access network 130. For example, the decision to establish a data connection via the mobile core network 140 may be triggered by the application 107 requesting to establish a PDU session to the first data network 150 and where policy in the remote unit indicates that this PDU session should preferably be established over non-3GPP access. However, if the remote unit 105 does not support the NAS protocol over non-3GPP access, then the remote unit 105 requires the aid of an interworking function 135. As discussed above, the remote unit 105 must select 1) a PLMN (e.g., a mobile core network 140) to connect to via non-3GPP access, 2) a network slice (e.g., S-NSSAI) to use in the selected PLMN, and 3) a non-3GPP access network that can provide connectivity to the selected PLMN and to the selected slice type.

In some embodiments, the remote unit 105 determines whether to use a trusted non-3GPP access network or an untrusted non-3GPP access network. Such a decision may be made based on capabilities of the remote unit 105 and connectivity capabilities of the discovers non-3GPP access networks 130. In response to deciding to use a trusted non-3GPP access network, the remote unit 105 determine a non-3GPP access network 130 and a type of connectivity to use to connect to the mobile core network 140.

Figure 2A:
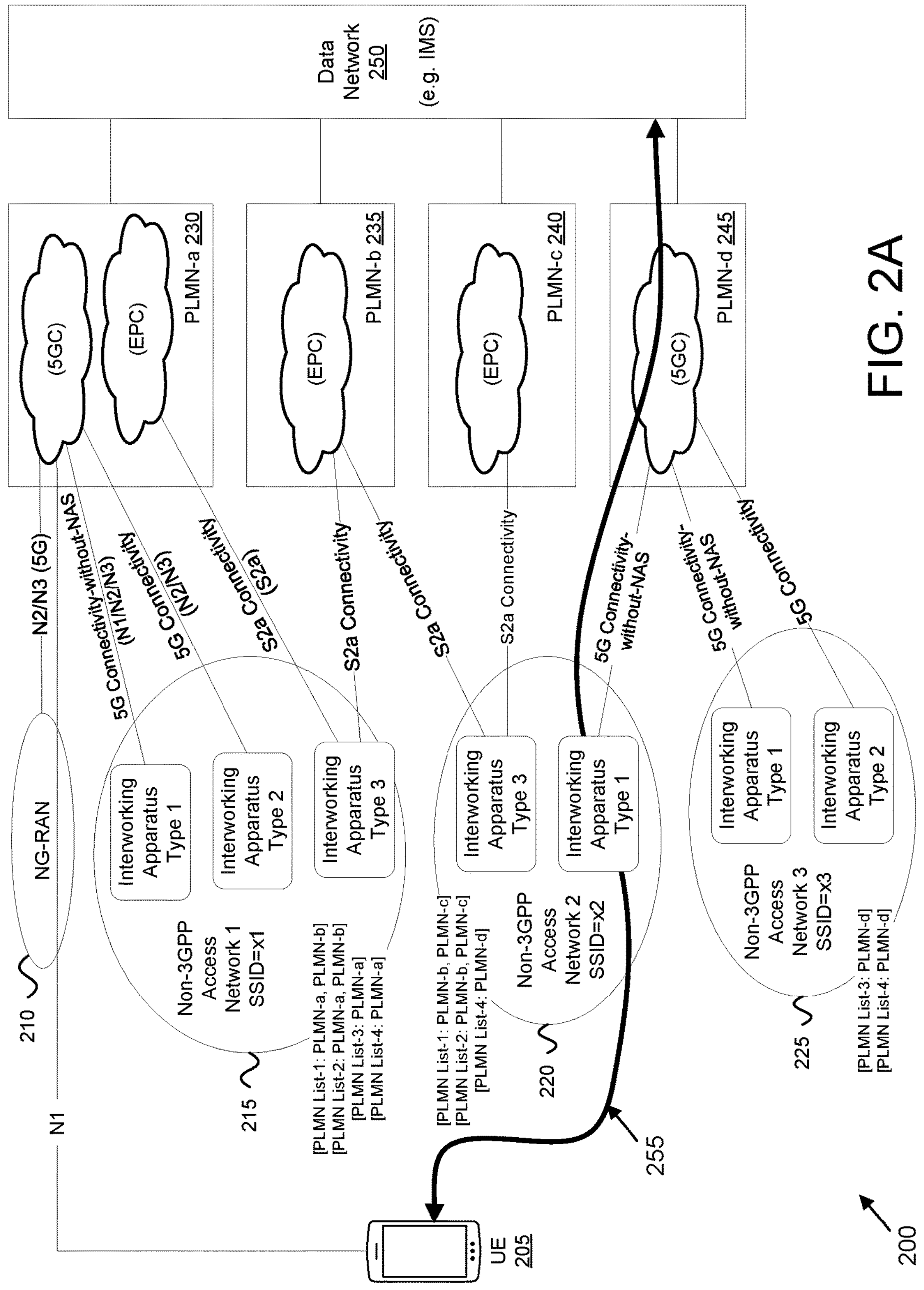
FIG. 2A illustrates one example of a network architecture that supports techniques for access network selection for UEs not supporting the NAS protocol over non-3GPP access in accordance with aspects of the present disclosure.

FIG. 2A depicts a network architecture 200 for access network selection for UEs not supporting the NAS protocol over non-3GPP access, in accordance with aspects of the present disclosure. The network architecture 200 includes a UE 205 which does not support the NAS protocol over non-3GPP access and wants to establish a data connection to the data network ("DN") 250 over a non-3GPP access network and via a 5GC network in a PLMN.

In one example, the UE 205 may want to establish a data connection to IP Multimedia Subsystem ("IMS") in order to utilize IMS-based multimedia services, e.g. video calling. In another example, the UE 205 may want to establish a data connection to the MMS servers of a mobile operator in order to send and receive MMS messages. In yet another example, the UE 205 may simply want to establish a data connection to the Internet via a 5GC in order to benefit from the enhanced connectivity services offers by the 5G operator, e.g. anti-virus protection, malware detection, content compression, etc. In all these examples, the UE 205 must have a subscription with a 5G PLMN (the Home PLMN of the UE 205) and the necessary access credentials.

The N1 interfaces shown in FIG. 2A carry NAS messages between the UE 205 and 5GC in the first PLMN 230, via NG-RAN 210. As noted above, there is currently a large number of UEs (including laptops, IoT devices, etc.) which do not support the NAS protocol over non-3GPP access but, yet, they may want to establish connectivity via 5GC, e.g. to utilize 5GC-based services, such as IMS multimedia services, optimized IoT connectivity services, etc. In order to enable UEs which do not support the NAS protocol over non-3GPP access to establish connectivity via 5G core networks, the non-3GPP access network must support an Interworking Apparatus, which implements the NAS protocol and exchanges NAS messages with the 5GC on behalf of the UE. In FIG. 2A, this Interworking Apparatus is the Interworking Apparatus Type 1, which supports an N1 interface toward 5GC (for NAS message exchange), in addition to the regular N2 and N3 interfaces.

As shown in FIG. 2A, a non-3GPP access network may support three different types of Interworking Apparatuses:

Type 1: Each Interworking Apparatus Type 1 supports connectivity to one or more 5GC networks for UEs which do not support the NAS protocol. An example for such Interworking Apparatus is the Trusted WLAN Interworking Function ("TWIF") and the Fixed Network Residential Gateway ("FN-RG").

Type 2: Each Interworking Apparatus Type 2 supports connectivity to one or more 5GC networks for UEs which do support the NAS protocol over non-3GPP access and the applicable NAS procedures. An example of such Interworking Apparatus is the Trusted Non-3GPP Gateway Function ("TNGF").

Type 3: Each Interworking Apparatus Type 3 supports connectivity to one or more EPC networks for UEs which support the applicable S2a connectivity procedures and protocols. An example of such Interworking Apparatus is the Trusted WLAN Access Gateway ("TWAG").

For establishing a data connection with a DN, the UE 205 needs (a) to select a 5G PLMN network, (b) to select a slice type to be used in the selected 5G PLMN, and (b) to select a non-3GPP access network that can provide "5G connectivity-without-NAS" to the selected slice type in the selected 5G PLMN (recall that the UE 205 does not support the NAS protocol over non-3GPP access). The UE 205 makes these selections by executing an "access network selection" procedure, e.g., as described herein. After the access network selection procedure is executed, the UE 205 initiates a connectivity procedure over the selected non-3GPP access network. During this connectivity procedure, the UE 205 is authenticated by its Home PLMN, it is authorized to connect to the selected non-3GPP access network and to the selected 5G PLMN, and a data connection 255 via the non-3GPP access network and the 5G PLMN is established that connects the UE 205 with the Data Network 250. This data connection 255 goes through the selected slice type in the selected 5G PLMN.

In the depicted scenario, the UE 205 has discovered three non-3GPP access networks 215-225. The first non-3GPP access network 215 is identified by Service Set Identifier ("SSID") 'x1' and contains all three types of interworking apparatuses. The second non-3GPP access network 220 is identified by SSID 'x2' and contains interworking apparatuses of the first and third types. The third non-3GPP access network 225 is identified by SSID 'x3' and contains interworking apparatuses of the first and second types.

The network architecture 200 includes four PLMNs: a first PLMN 230 (denoted "PLMN-a"), a second PLMN 235 (denoted "PLMN-b"), a third PLMN 240 (denoted "PLMN-c"), and a fourth PLMN 245 (denoted "PLMN-d"). The first PLMN 230 includes a 5GC and an EPC. Note that the first PLMN 230 interworks with the first non-3GPP access network 215 using "5G connectivity-without-NAS," "5G connectivity," and "S2a connectivity." The second PLMN 235 includes an EPC. Note that the second PLMN 235 interworks with the first non-3GPP access network 215 using "S2a connectivity" and with the second non-3GPP access network 220 using "S2a connectivity."

The third PLMN 240 includes an EPC. Note that the third PLMN 240 interworks with the second non-3GPP access network 220 using "S2a connectivity." The fourth PLMN 245 includes a 5GC. Note that the fourth PLMN 245 interworks with the second non-3GPP access network 220 using "5G connectivity-without-NAS" and interworks with the third non-3GPP access network 225 using "5G connectivity-without-NAS" and "5G connectivity."

The non-3GPP access networks 215-225 advertise information about the 3GPP networks (PLMNs) they interwork with, e.g., by using the Access Network Query Protocol ("ANQP") protocol. Note that each non-3GPP access network may support "S2a connectivity," "5G connectivity" and/or "5G connectivity-without-NAS" to one or more PLMNs. To connect to a PLMN using a non-3GPP access network, the UE 205 needs to select (a) a non-3GPP access network, (b) a PLMN, and (c) a connectivity type, i.e. "S2a connectivity", "5G connectivity," or "5G connectivity-without-NAS". If the UE 205 does not support the NAS protocol over no-3GPP access, then the UE 205 is unable to use interworking apparatuses of the second and third types. Selection procedures for a UE that does support the NAS protocol over non-3GPP access are discussed in Patent Cooperation Treaty ("PCT") application PCT/EP2018/

077364 titled "Selecting a non-3GPP access network," which is incorporated by reference.

Each non-3GPP access network may advertise one or more of: a PLMN List-1, a PLMN List-2, a PLMN List-3, and a PLMN List-4. A PLMN List-1 includes those PLMNs with which "AAA connectivity" is supported. A non-3GPP access network supports "AAA connectivity" with a PLMN when it deploys an Authentication, Authorization, and Accounting ("AAA") function that can connect with a 3GPP AAA Server/Proxy in this PLMN, via an STa interface (i.e., trusted WLAN to EPC), or via a SWa interface (i.e., untrusted WLAN to EPC).

A PLMN List-2 includes PLMNs with which "S2a connectivity" is supported. A non-3GPP access network supports "S2a connectivity" with a PLMN when it deploys an interworking apparatus that can connect with a P-GW in this PLMN, via an S2a interface (e.g., deploys a Type 3 interworking function).

A PLMN List-3 includes PLMNs with which "5G connectivity" is supported. A non-3GPP access network supports "5G connectivity" with a PLMN when it deploys a TNGF function that can connect with an AMF function and an UPF function in this PLMN via N2 and N3 interfaces, respectively (e.g., deploys a Type 2 interworking function).

A PLMN List-4 includes PLMNs with which "5G connectivity-without-NAS" is supported. A non-3GPP access network supports "5G connectivity-without-NAS" with a PLMN when it deploys an interworking function that can connect with an AMF function in this PLMN via N1 and N2 interfaces and with an UPF function in this PLMN via N3 interface (e.g., deploys a Type 1 interworking function).

In some embodiments, the UE 205 sends an ANQP query to a non-3GPP access network requesting "3GPP Cellular Network" information. In response, the non-3GPP access network replies with an ANQP response having a "3GPP Cellular Network" information element that contains the PLMN List-1, the PLMN List-2, the PLMN List-3 and/or the PLMN List-4. Note that the PLMN List-3 and PLMN List-4 may be used to indicate interworking with 5G PLMNs.

The UE 205 determines if a non-3GPP access network supports "5G connectivity-without-NAS" to a given PLMN by receiving the PLMN List-4 advertised by this non-3GPP access network. For a given PLMN, if this PLMN is not included in the PLMN List-4 advertised by a non-3GPP access network, then the non-3GPP access network does not support "5G connectivity-without-NAS."

In the depicted embodiment, the first non-3GPP access network 215 advertises a PLMN List-1 of "PLMN-a, PLMN-b," a PLMN List-2 of "PLMN-a, PLMN-b," a PLMN List-3 of "PLMN-a" and a PLMN List-3 of "PLMN-a." The second non-3GPP access network 220 advertises a PLMN List-1 of "PLMN-b, PLMN-c," a PLMN List-2 of "PLMN-b, PLMN-c," and a PLMN List-4 of "PLMN-d." The third non-3GPP access network 225 advertises a PLMN List-3 of "PLMN-d" and a PLMN List-4 of "PLMN-d."

FIG. 2B depicts one embodiment of the UE 205 generating a list of available non-3GPP access networks 260 and a list of available PLMNs 265, in accordance with aspects of the present disclosure. From the PLMN Lists-1, PLMN Lists-2, PLMN Lists-3, and PLMN Lists-4 advertised by the non-3GPP access networks 215-225, the UE 205 creates a list of available non-3GPP access networks 260. As depicted, the list of available non-3GPP access networks 260 includes identifiers for the available non-3GPP access networks 215-225 (e.g., SSIDs). For each available non-3GPP access network, the list of available non-3GPP access networks 260 indicates those PLMNs for which the WLAN supports trusted connectivity as well as the types of connectivity supported (e.g., S2a connectivity, 5G connectivity, and/or 5G connectivity-without-NAS).

From the information in the list of available non-3GPP access networks 260, the UE 205 may create a list of available PLMNs 265. Here, the list of available PLMNs 265 indicates the available PLMNs and the types of trusted connectivity supported (e.g., S2a connectivity, 5G connectivity, and/or 5G connectivity-without-NAS). From this, the UE 205 may derive a list 270 of available PLMNs connectable via a non-3GPP access network without using the NAS protocol.

Figure 3:
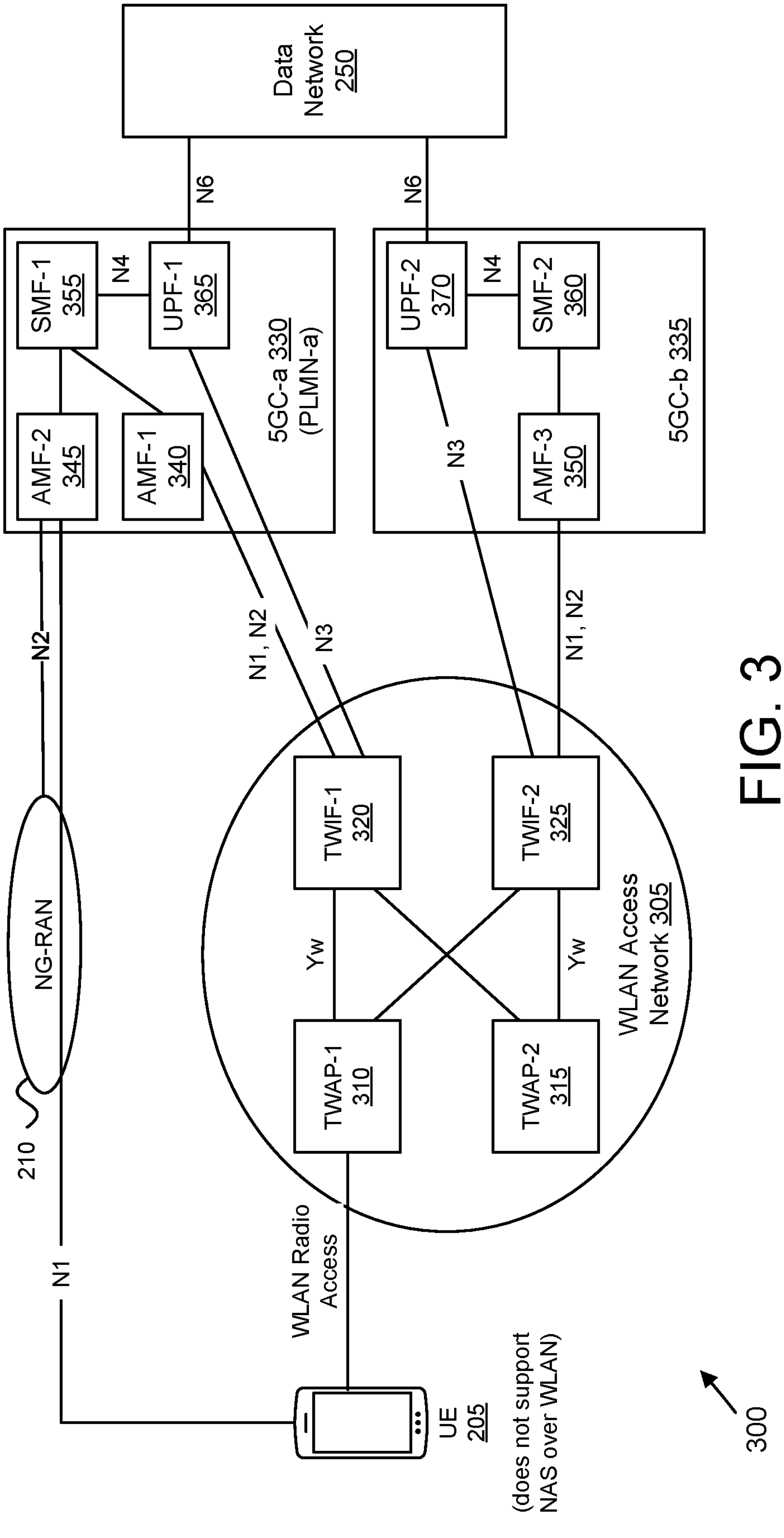
FIG. 3 illustrates one example of a network architecture that supports techniques for access network selection for UEs not supporting the NAS protocol over non-3GPP access in accordance with aspects of the present disclosure.

FIG. 3 depicts a first system architecture 300 including a WLAN supporting 5G connectivity-without-NAS. FIG. 3 shows a more detailed system architecture for the case where the non-3GPP access network is a WLAN access network. The first system architecture 300 may be one embodiment of the network architecture 200. For ease of illustration, only two 5G PLMNs are shown: a first 5GC 330 (denoted "5GC-a") and a second 5GC 335 (denoted "5GC-b"). Each 5GC belongs to a PLMN, for example the first PLMN 230 and the fourth PLMN 245. As depicted, the first 5GC 330 includes a first AMF 340 (denoted "AMF-1"), a second AMF 345 (denoted "AMF-2"), a first SMF 355 (denoted "SMF-1"), and a first UPF 365 (denoted "UPF-1"). As depicted, the second 5GC 335 includes a third AMF 350 (denoted "AMF-3"), a second SMF 360 (denoted "SMF-2"), and a second UPF 370 (denoted "UPF-2").

The first system architecture 300 includes a WLAN access network 305 that considered a "trusted" WLAN access network from the PLMNs point of view, because it directly interfaces with these PLMNs via the standard N1, N2 and N3 interfaces. The WLAN access network 305 includes a first TWAP 310 (denoted "TWAP-1") and a second TWAP 315 (denoted "TWAP-2"). The TWAPs (Trusted WLAN Access Points) are similar to a regular WLAN access point. The WLAN access network 305 includes a first TWIF 320 (denoted "TWIF-1") and a second TWIF (denoted "TWIF-2") 325. The TWIFs 320, 325 are embodiments of the Interworking Apparatus Type 1.

Figure 4:
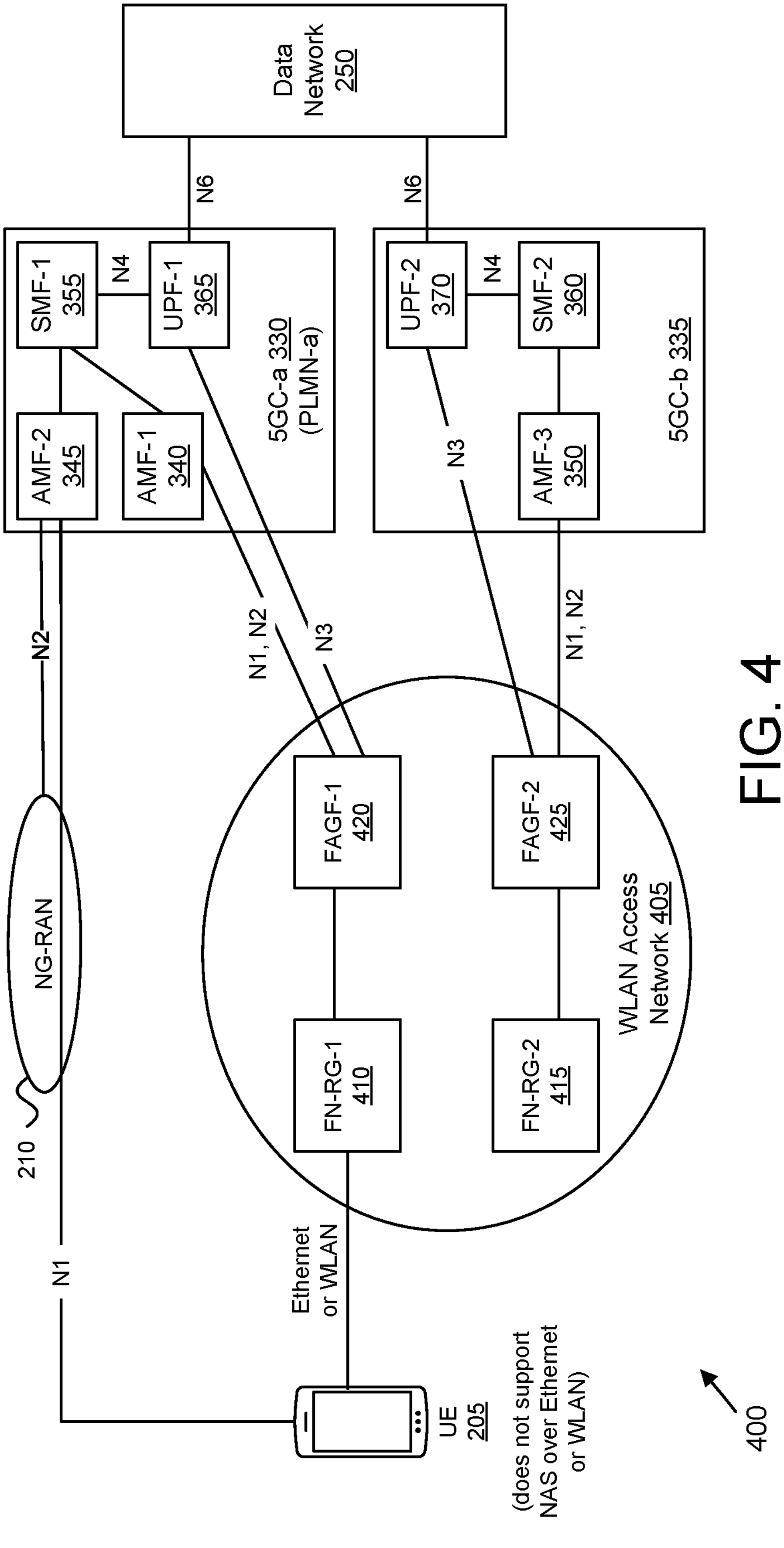
FIG. 4 illustrates another example of a network architecture that supports techniques for access network selection for UEs not supporting the NAS protocol over non-3GPP access in accordance with aspects of the present disclosure.

FIG. 4 depicts a second system architecture 400 including a fixed broadband access network supporting 5G connectivity-without-NAS. FIG. 4 shows a more detailed system architecture for the case where the non-3GPP access network is a fixed broadband access network. The second system architecture 400 may be one embodiment of the network architecture 200. For ease of illustration, only two 5G PLMNs are shown: the first 5GC 330 (denoted "5GC-a") and the second 5GC 335 (denoted "5GC-b").

The second system architecture 400 includes a fixed broadband access network 405 that directly interfaces with these PLMNs via the standard N1, N2 and N3 interfaces. The fixed broadband access network 405 includes a first FN-RG 410 (denoted "FN-RG-1") and a second FN-RG 415 (denoted "FN-RG-2"). The FN-RGs are residential gateways providing Ethernet or WLAN access to UEs. The fixed broadband access network 405 includes a first Fixed Access Gateway Function ("FAGF") 420 (denoted "FAGF-1") and a second FAGF 425 (denoted "FAGF-2"). The FAGFs are embodiments of the Interworking Apparatus Type 1.

Figure 5:
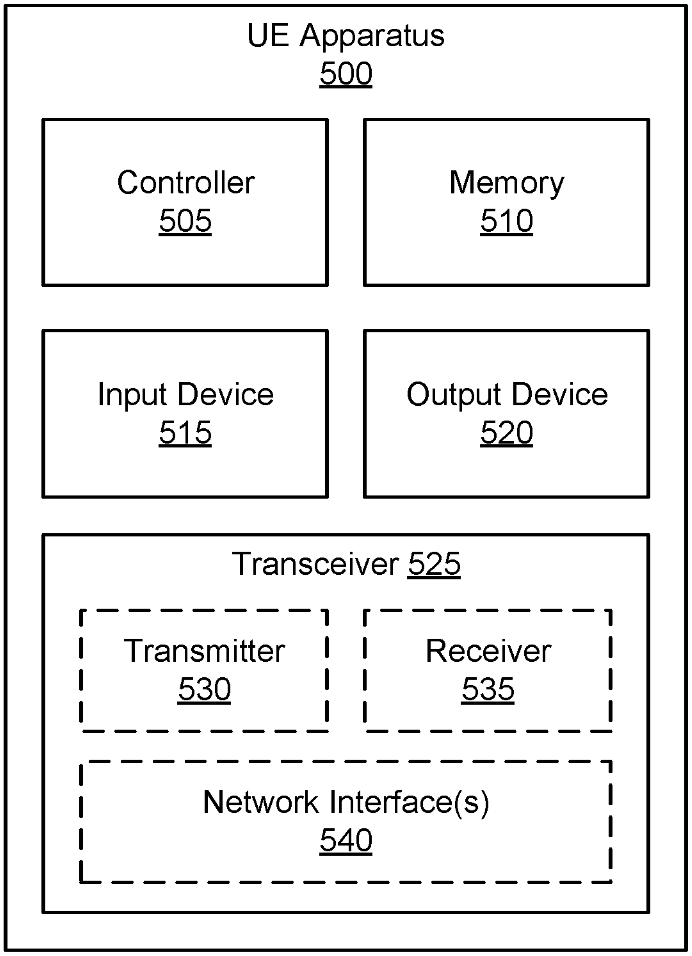
FIG. 5 illustrates one example of a UE apparatus that supports techniques for access network selection for UEs not supporting the NAS protocol over non-3GPP access in accordance with aspects of the present disclosure.

FIG. 5 depicts one embodiment of a user equipment apparatus 500 that may be used for access network selection for UEs not supporting the NAS protocol over non-3GPP access, in accordance with aspects of the present disclosure. The user equipment apparatus 500 may be one embodiment of the remote unit 105. Furthermore, the user equipment apparatus 500 may include a processor 505, a memory 510, an input device 515, an output device 520, a transceiver 525. In some embodiments, the input device 515 and the output device 520 are combined into a single device, such as a touch screen. In certain embodiments, the user equipment apparatus 500 does not include any input device 515 and/or output device 520.

As depicted, the transceiver 525 includes at least one transmitter 530 and at least one receiver 535. Here, the transceiver 525 communicates with one or more non-3GPP access networks. Additionally, the transceiver 525 may support at least one network interface 540. Here, the at least one network interface 540 facilitates communication with an eNB or gNB (e.g., using the "Uu" interface). Additionally, the at least one network interface 540 may include an interface used for communications with an UPF, an SMF, and/or a Proxy Call Session Control Function ("P-CSCF").

The processor 505, in one embodiment, may include any known controller capable of executing computer-readable instructions and/or capable of performing logical operations. For example, the processor 505 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 505 executes instructions stored in the memory 510 to perform the methods and routines described herein. The processor 505 is communicatively coupled to the memory 510, the input device 515, the output device 520, and the transceiver 525.

In a first implementation, the processor 505 creates a first list of available PLMNs, each PLMN connectable via a non-3GPP access network without using the NAS protocol (e.g., as depicted in the list 270). The processor 505 selects a first PLMN from the first list and selects a first network slice supported by the first PLMN. Here, the first network slice is identified by a first S-NSSAI. The processor 505 creates a second list of available non-3GPP access networks (e.g., connectable to the first PLMN and first network slice) and selects a first non-3GPP access network from the second list. The processor 505 then controls the transceiver 525 to begin a connectivity procedure over the first non-3GPP access network. Here, the connectivity procedure creates a data connection for the apparatus via the first network slice in the first PLMN. Moreover, the connectivity procedure does not use the NAS protocol.

In some embodiments, the processor 505 creates the first list of available PLMNs by discovering a plurality of available non-3GPP access networks and determining, for each available non-3GPP access network, a set of PLMNs which are connectable without using the NAS protocol and one or more network slices supported by each PLMN in the set. In certain embodiments, determining the set of PLMNs which are connectable without using the NAS protocol and the one or more network slices supported by each PLMN in the set includes using an access network query protocol to acquire a list of PLMNs connectable via each available non-3GPP access network without using the NAS protocol and the network slices supported for each PLMN in the list of PLMNs connectable via each available non-3GPP access network without using the NAS protocol.

In certain embodiments, the first non-3GPP access network is a highest priority available non-3GPP access network that supports connectivity to the first network slice in the first PLMN. In some embodiments, the processor 505 selects the first S-NSSAI using configuration information in the apparatus. In some embodiments, creating the second list includes discovering a plurality of available non-3GPP access networks and ordering the plurality of available non-3GPP access networks into a prioritized list based on a set of WLAN Selection Policy ("WLANSP") rules. In such embodiments, the second list may be ordered based on operating parameters of the plurality of available non-3GPP access networks.

In some embodiments, beginning the connectivity procedure over the first non-3GPP access network includes sending a request message to the first non-3GPP access network that indicates the first PLMN and the first S-NSSAI. In certain embodiments, the request message includes Network Access Identifier ("NAI") containing identifiers for the first PLMN and for the first S-NSSAI. In certain embodiments, beginning the connectivity procedure includes creating a data connection via the first network slice in the first PLMN and via one of: a TWIF in the first non-3GPP access network, and a FN-RG in the first non-3GPP access network.

The memory 510, in one embodiment, is a computer readable storage medium. In some embodiments, the memory 510 includes volatile computer storage media. For example, the memory 510 may include a Random-Access Memory ("RAM"), including dynamic RAM ("DRAM"), synchronous dynamic RAM ("SDRAM"), and/or static RAM ("SRAM"). In some embodiments, the memory 510 includes non-volatile computer storage media. For example, the memory 510 may include a hard disk drive, a flash memory, or any other suitable non-volatile computer storage device. In some embodiments, the memory 510 includes both volatile and non-volatile computer storage media. In some embodiments, the memory 510 stores data relating to access network selection, for example storing lists of available non-3GPP access networks, lists of available PLMNs, priority rules, and the like. In certain embodiments, the memory 510 also stores program code and related data, such as an operating system ("OS") or other controller algorithms operating on the user equipment apparatus 500 and one or more software applications.

The input device 515, in one embodiment, may include any known computer input device including a touch panel, a button, a keyboard, a stylus, a microphone, or the like. In some embodiments, the input device 515 may be integrated with the output device 520, for example, as a touchscreen or similar touch-sensitive display. In some embodiments, the input device 515 includes a touchscreen such that text may be input using a virtual keyboard displayed on the touchscreen and/or by handwriting on the touchscreen. In some embodiments, the input device 515 includes two or more different devices, such as a keyboard and a touch panel.

The output device 520, in one embodiment, may include any known electronically controllable display or display device. The output device 520 may be designed to output visual, audible, and/or haptic signals. In some embodiments, the output device 520 includes an electronic display capable of outputting visual data to a user. For example, the output device 520 may include, but is not limited to, a liquid crystal display ("LCD"), a light-emitting diode ("LED") display, an organic LED ("OLED") display, a projector, or similar display device capable of outputting images, text, or the like to a user. As another, non-limiting, example, the output device 520 may include a wearable display such as a smart watch, smart glasses, a heads-up display, or the like. Further, the output device 520 may be a component of a smart phone, a personal digital assistant, a television, a table computer, a notebook (laptop) computer, a personal computer, a vehicle dashboard, or the like.

In certain embodiments, the output device 520 includes one or more speakers for producing sound. For example, the output device 520 may produce an audible alert or notification (e.g., a beep or chime). In some embodiments, the output device 520 includes one or more haptic devices for producing vibrations, motion, or other haptic feedback. In some embodiments, all or portions of the output device 520 may be integrated with the input device 515. For example, the input device 515 and output device 520 may form a touchscreen or similar touch-sensitive display. In other embodiments, all or portions of the output device 520 may be located near the input device 515.

As discussed above, the transceiver 525 communicates with one or more network functions of a mobile communication network via one or more access networks. The transceiver 525 operates under the control of the processor 505 to transmit messages, data, and other signals and also to receive messages, data, and other signals. For example, the processor 505 may selectively activate the transceiver (or portions thereof) at particular times in order to send and receive messages. The transceiver 525 may include one or more transmitters 530 and one or more receivers 535. In certain embodiments, the one or more transmitters 530 and/or the one or more receivers 535 may share transceiver hardware and/or circuitry. For example, the one or more transmitters 530 and/or the one or more receivers 535 may share antenna(s), antenna tuner(s), amplifier(s), filter(s), oscillator(s), mixer(s), modulator/demodulator(s), power supply, and the like.

In various embodiments, the transceiver 525 is configured to communication with 3GPP access network(s) 120 and the non-3GPP access network(s) 130. In some embodiments, the transceiver 525 implements modem functionality for the 3GPP access network(s) 120 and/or the non-3GPP access network(s) 130. In one embodiment, the transceiver 525 implements multiple logical transceivers using different communication protocols or protocol stacks, while using common physical hardware.

Figure 6:
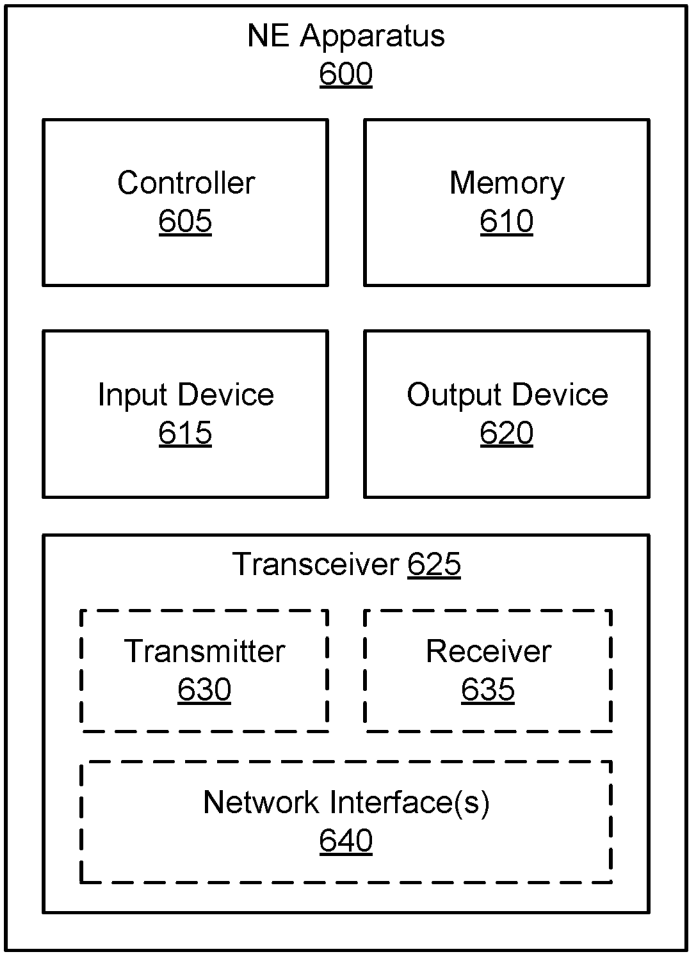
FIG. 6 illustrates one example of a network equipment ("NE") apparatus that supports techniques for access network selection for UEs not supporting the NAS protocol over non-3GPP access in accordance with aspects of the present disclosure.

FIG. 6 depicts one embodiment of a network equipment apparatus 600 that may be used for access network selection for UEs not supporting the NAS protocol over non-3GPP access, in accordance with aspects of the present disclosure. The network equipment apparatus 600 may be one embodiment of the remote unit 105. Furthermore, network equipment apparatus 600 may include a processor 605, a memory 610, an input device 615, an output device 620, a transceiver 625. In some embodiments, the input device 615 and the output device 620 are combined into a single device, such as a touch screen. In certain embodiments, the network equipment apparatus 600 does not include any input device 615 and/or output device 620.

As depicted, the transceiver 625 includes at least one transmitter 630 and at least one receiver 635. Here, the transceiver 625 communicates with one or more remote units 105 and with one or more interworking functions 135 that provide access to one or more PLMNs Additionally, the transceiver 625 may support at least one network interface 640. Here, the at least one network interface 640 facilitates communication with an AMF (e.g., using the "N1" and/or "N2" interface). Additionally, the at least one network interface 640 may include an interface used for communications with an UPF, an SMF, and/or a P-CSCF.

The processor 605, in one embodiment, may include any known controller capable of executing computer-readable instructions and/or capable of performing logical operations. For example, the processor 605 may be a microcontroller, a microprocessor, a CPU, a GPU, an auxiliary processing unit, a FPGA, or similar programmable controller. In some embodiments, the processor 605 executes instructions stored in the memory 610 to perform the methods and routines described herein. The processor 605 is communicatively coupled to the memory 610, the input device 615, the output device 620, and the transceiver 625.

In a first implementation, the processor 605 receives, from one or more interworking functions, a set of PLMNs for which connectivity is supported without using the NAS protocol. The processor 605 receives, for each PLMN in the set, a list of one or more supported network slices, a network slice being identified by a S-NSSAI. The processor 605 receives, from a first remote unit, a connection request message, the connection request message indicating a first PLMN from the set and a first S-NSSAI. The processor 605 controls the transceiver 625 to forward the connection request message to a first interworking function.

In some embodiments, the processor 605 further selects the first interworking function based on the first PLMN and the first S-NSSAI. In certain embodiments, the connection request message includes a NAI containing identifiers for the first PLMN and for the first S-NSSAI.

The memory 610, in one embodiment, is a computer readable storage medium. In some embodiments, the memory 610 includes volatile computer storage media. For example, the memory 610 may include a RAM, including DRAM, SDRAM, and/or SRAM. In some embodiments, the memory 610 includes non-volatile computer storage media. For example, the memory 610 may include a hard disk drive, a flash memory, or any other suitable non-volatile computer storage device. In some embodiments, the memory 610 includes both volatile and non-volatile computer storage media. In some embodiments, the memory 610 stores data relating to access network selection, for example storing lists of available PLMNs, priority rules, and the like. In certain embodiments, the memory 610 also stores program code and related data, such as an OS or other controller algorithms operating on the network equipment apparatus 600 and one or more software applications.

The input device 615, in one embodiment, may include any known computer input device including a touch panel, a button, a keyboard, a stylus, a microphone, or the like. In some embodiments, the input device 615 may be integrated with the output device 620, for example, as a touchscreen or similar touch-sensitive display. In some embodiments, the input device 615 includes a touchscreen such that text may be input using a virtual keyboard displayed on the touchscreen and/or by handwriting on the touchscreen. In some embodiments, the input device 615 includes two or more different devices, such as a keyboard and a touch panel.

The output device 620, in one embodiment, may include any known electronically controllable display or display device. The output device 620 may be designed to output visual, audible, and/or haptic signals. In some embodiments, the output device 620 includes an electronic display capable of outputting visual data to a user. For example, the output device 620 may include, but is not limited to, an LCD display, an LED display, an OLED display, a projector, or similar display device capable of outputting images, text, or the like to a user. As another, non-limiting, example, the output device 620 may include a wearable display such as a smart watch, smart glasses, a heads-up display, or the like. Further, the output device 620 may be a component of a smart phone, a personal digital assistant, a television, a table computer, a notebook (laptop) computer, a personal computer, a vehicle dashboard, or the like.

In certain embodiments, the output device 620 includes one or more speakers for producing sound. For example, the output device 620 may produce an audible alert or notification (e.g., a beep or chime). In some embodiments, the output device 620 includes one or more haptic devices for producing vibrations, motion, or other haptic feedback. In some embodiments, all or portions of the output device 620 may be integrated with the input device 615. For example, the input device 615 and output device 620 may form a touchscreen or similar touch-sensitive display. In other embodiments, all or portions of the output device 620 may be located near the input device 615.

As discussed above, the transceiver 625 communicates with one or more remote units and with one or more interworking functions that provide access to one or more PLMNs. The transceiver 625 operates under the control of the processor 605 to transmit messages, data, and other signals and also to receive messages, data, and other signals. For example, the processor 605 may selectively activate the transceiver (or portions thereof) at particular times in order to send and receive messages. The transceiver 625 may include one or more transmitters 630 and one or more receivers 635. In certain embodiments, the one or more transmitters 630 and/or the one or more receivers 635 may share transceiver hardware and/or circuitry. For example, the one or more transmitters 630 and/or the one or more receivers 635 may share antenna(s), antenna tuner(s), amplifier(s), filter(s), oscillator(s), mixer(s), modulator/demodulator(s), power supply, and the like.

In various embodiments, the transceiver 625 is configured to communication with 3GPP access network(s) 120 and the non-3GPP access network(s) 130. In some embodiments, the transceiver 625 implements modem functionality for the 3GPP access network(s) 120 and/or the non-3GPP access network(s) 130. In one embodiment, the transceiver 625 implements multiple logical transceivers using different communication protocols or protocol stacks, while using common physical hardware.

Figure 7A:
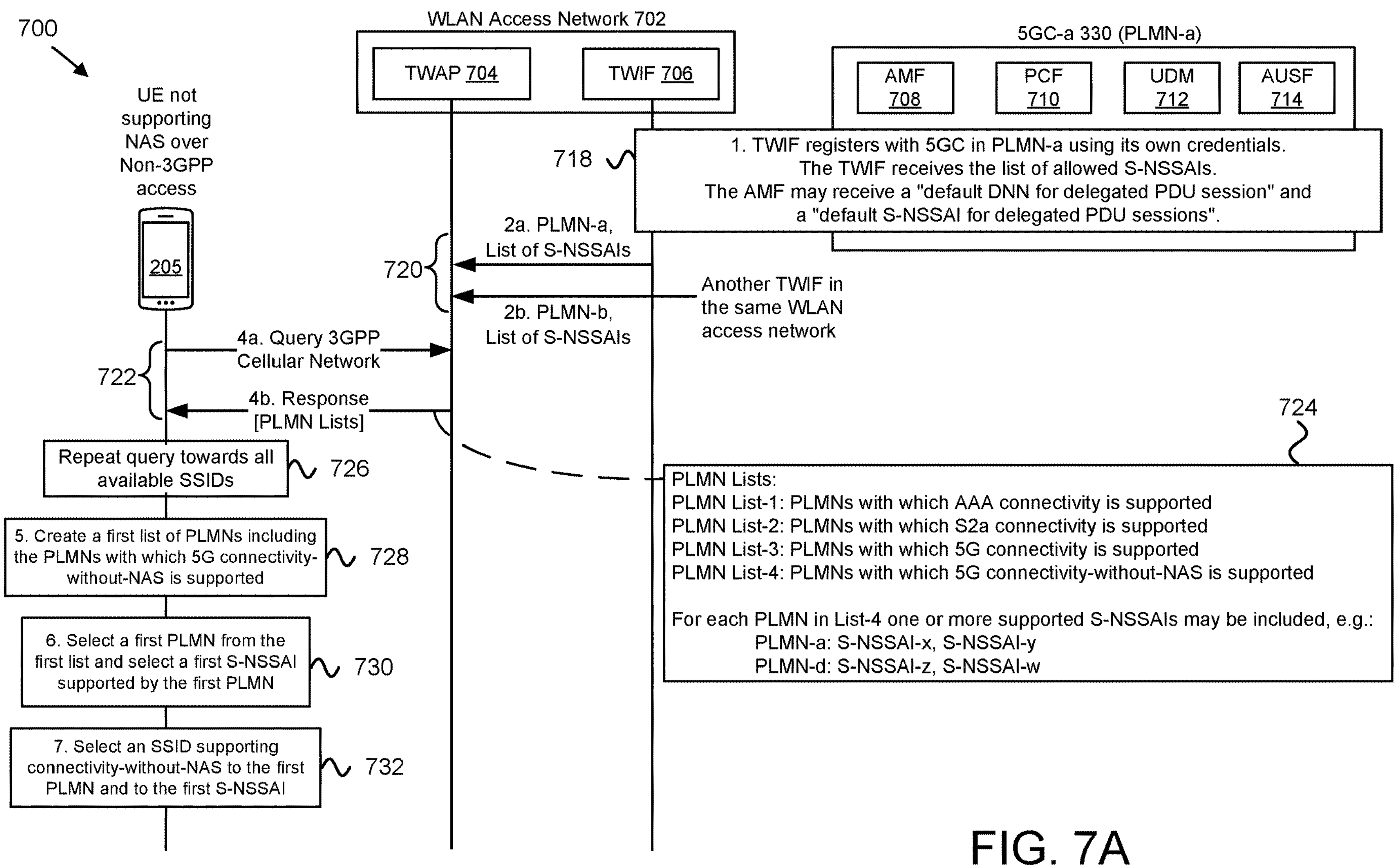
FIG. 7A illustrates one example of a network procedure that supports techniques for access network selection for UEs not supporting the NAS protocol over non-3GPP access in accordance with aspects of the present disclosure.
Figure 7B:
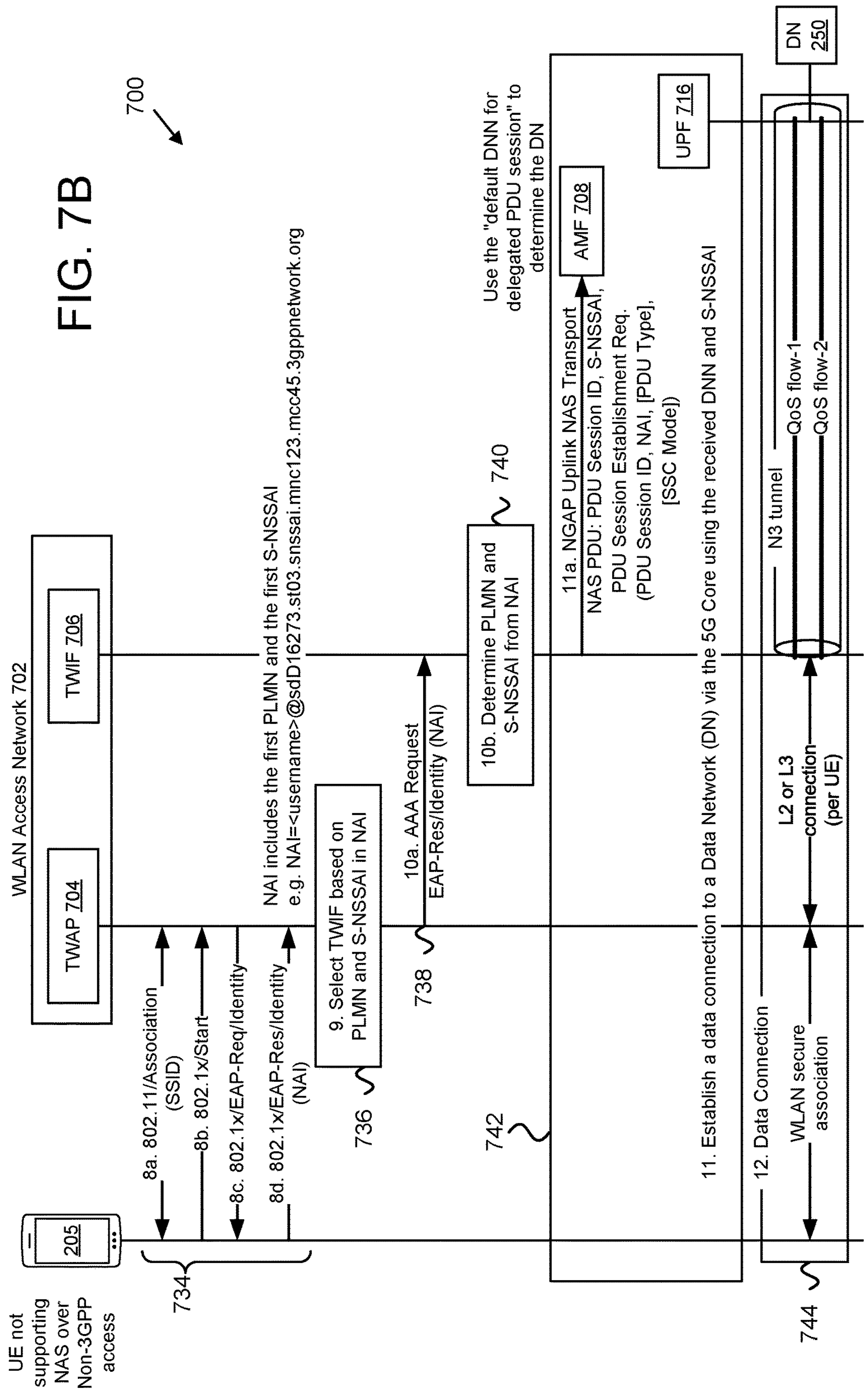
FIG. 7B is a continuation of the network procedure of FIG. 7A.

FIGS. 7A-7B depicts an access network selection procedure 700 for access network selection for UEs not supporting the NAS protocol over non-3GPP access, in accordance with aspects of the present disclosure. The access network selection procedure 700 involves the UE 205, which does not support the NAS protocol over non-3GPP access, and wants to establish a data connection to a data network (e.g. IMS) via a 5G PLMN and via a non-3GPP access network. As aforementioned, the UE 205 executes the access network selection procedure 700 in order to (a) select a 5G PLMN network, (b) select a slice type to be used in the selected 5G PLMN, and (b) select a non-3GPP access network that can provide 5G connectivity-without-NAS to the selected slice type in the selected 5G PLMN.

The access network selection procedure 700 further involves a WLAN access network 702, an example of a non-3GPP access network, and a 5GC-a 330, an example of a 5GC in a PLMN. Note that the WLAN access network 702 includes a TWAP 704 and a TWIF 706. The WLAN access network 702 may be one embodiment of the non-3GPP access network 130 and/or WLAN access network 305, discussed above. As such, the TWAP 704 may be one embodiment of the access point 131 and the TWIF 706 may be one embodiment of the interworking function 135. While FIGS. 7A-7B show one TWIF, there may be multiple TWIFs in the same WLAN access network, as shown in FIG. 3. Also, while FIGS. 7A-7B show only one 5G PLMN available via the TWIF 706, the same TWIF may support interworking with multiple 5G PLMNs.

The access network selection procedure 700 begins in Step 1 as the TWIF 706 (e.g., each TWIF in the WLAN access network 702) registers with the 5GC-a 330 (e.g., in PLMN-a) using its own credentials (see block 718). This registration uses NAS signaling between the TWIF 706 and an AMF 708 in the 5GC-a 330. In the Registration Accept message received by the TWIF 706 there is a list of "allowed S-NSSAIs", which indicates the S-NSSAIs (network slice types) in the 5GC-a 330 that the TWIF 706 is allowed to use. This means that the TWIF 706 may request a data connection (e.g., a PDU Session) using any of the allowed S-NSSAIs. Note that the AMF 708 may receive a "default DNN for delegated PDU session' and a "default S-NSSAI for delegated PDU sessions." Here, "default DNN" refers to a default Data Network name ("DNN").

In Step 2, the TWIF 706 indicates to the TWAP 704 (and to any other TWAP it can communicate with) that it supports 5G connectivity-without-NAS to PLMN-a and to the list of "allowed S-NSSAIs" in PLMN-a (see messaging 720). The TWAP 704 may receive similar indications from all other TWIFs it can communicate with. After this step, the TWAP 704 knows the PLMNs with which it can provide 5G connectivity-without-NAS and the S-NSSAIs (slice types) in each one of these PLMNs.

Note that the steps 1-2 shown here are not part of the access network selection procedure executed by the UE 205, but may be used in order to indicate to TWAP 704 the 5G PLMNs and the slice types (S-NSSAIs) in each 5G PLMN which are supported by each TWIF 706.

In Step 4, the UE 205 discovers information about each available non-3GPP access network (including the WLAN access network 702), wherein the information includes operating parameters (e.g., Basic Service Set ('BSS") load, backhaul bandwidth, etc.) and a list of supported PLMNs 724 (see messaging 722). Additionally, each PLMN may optionally be associated with a connectivity type. In one example, this information is discovered by sending an ANQP Query to every available TWAP 704 and receiving an ANQP Response, wherein the response includes the operating parameters and the list of supported PLMNs (see block 726). The list of supported PLMNs 724 can include four different types of lists, each one associated with a different connectivity type:

PLMN List-1: It includes the PLMNs with which the TWAP can support AAA connectivity. This type of connectivity can be used for authenticating UEs by a PLMN in this list and for authorizing UEs access to the non-3GPP access network by a PLMN in this list.

PLMN List-2: It includes the PLMNs with which the TWAP can support S2a connectivity. This type of connectivity allows UEs to connect to an EPC network in one of the PLMNs in this list.

PLMN List-3: It includes the PLMNs with which the TWAP can support 5G connectivity. This type of connectivity allows UEs to connect to a 5GC network in one of the PLMNs in this list.

PLMN List-4: It includes the PLMNs with which the TWAP can support 5G connectivity-without-NAS. This type of connectivity allows UEs, which do not support the NAS protocol over non-3GPP access, to establish a data connection through a 5GC network in one of the PLMNs in this list. In addition, for each PLMN in the PLMN List-4, one or more supported S-NSSAIs may be included, as discussed above. A TWAP learns the PLMNs with which 5G connectivity-without-NAS is supported, as well as the S-NSSAIs supported by each of these PLMNs in step 2, i.e. after receiving this information from one or more TWIF.

In the example scenario shown in FIGS. 2A-2B, the UE may discover the following information:

For the first non-3GPP access network 215, the operating parameters may be: BSS load=30%, SSID=x1. Also, non-3GPP access network 1 supports 5G connectivity-without-NAS with PLMN-a (and, optionally, indicates network slices S-NSSAI-x and S-NSSAI-y).

For the second non-3GPP access network 220, the operating parameters may be: Backhaul DL speed=10 Mbps, Backhaul DL load=75%, SSID=x2. Also, non-3GPP access network 2 supports 5G connectivity-without-NAS with PLMN-s (and, optionally, indicates network slice S-NSSAI-z).

For the third non-3GPP access network 225, the operating parameters may be: SSID=x3. Also, non-3GPP access network 3 supports 5G connectivity-without-NAS with PLMN-d (and, optionally, indicates network slice S-NSSAI-w).

In Step 5, the UE 205 creates a first list of PLMNs that contains all PLMNs with which 5G connectivity-without-NAS is supported (see block 728). Essentially, this list contains the PLMNs included in the PLMN List-4 received by all available TWAPs. In the example scenario shown in FIG. 2B, the first list of PLMNs includes PLMN-a and PLMN-d.

In Step 6, the UE 205 selects a first PLMN from the first list of PLMNs and also a first S-NSSAI from the S-NSSAIs supported by the first PLMN (see block 730). In the example scenario shown in FIGS. 2A-2B, the UE 205 may select PLMN-d and one of the supported S-NSSAIs (either S-NSSAI-z or S-NSSAI-w). The first PLMN may be selected as follows: If the UE is connected to a PLMN via 3GPP access and this PLMN is included in the list of available PLMNs, the UE selects this PLMN. However, if the UE is connected to a PLMN via 3GPP access and this this PLMN is not included in the list of available PLMNs, but it is included in the "Non-3GPP access node selection information", then the UE 205 selects this PLMN and executes the Combined enhanced Packet Data Gateway and/or Non-3GPP Interworking Function ("ePDG/N3IWF") selection procedure.

Otherwise, if the UE 205 is not connected to a PLMN via 3GPP access, or if the UE 205 is connected to a PLMN via 3GPP access but this PLMN is neither in the list of available PLMNs nor in the "Non-3GPP access node selection information", then the UE 205 determines if it is in its home region/country or not. If the UE 205 determines to be located in its home region/country, then the UE 205 selects the home PLMN ("HPLMN"), if included in the list of available PLMNs. If not included in the list of available PLMNs, then the UE 205 selects an equivalent HPLMN ("E-HPLMN"), if an E-HPLMN is included in the list of available PLMNs. In certain embodiments, if the list of available PLMNs does not include the HPLMN and does not include an E-HPLMN, then the UE 205 stops the procedure and may attempt to connect via untrusted non-3GPP access.

If the UE 205 determines to be located in a visited region/country, then the UE 205 determines if it is mandatory to select a PLMN in the visited region/country. Determining if it is mandatory to select a PLMN in the visited region/country may include the following: if the UE 205 has Internet Protocol ("IP") connectivity (e.g., the UE 205 is connected via 3GPP access), the UE 205 sends a Domain Name System ("DNS") query and receives a DNS response that indicates if a PLMN must be selected in the visited region/country. The DNS response includes a lifetime that denotes how long the DNS response can be cached. In certain embodiments, the full qualified domain name ("FQDN") in the DNS query will be different from the DNS query used for ePDG/N3IWF selection. Also, the DNS response does not need to include a list of PLMNs that support "S2a connectivity" and/or "5G connectivity" because the UE 205 has the list of available PLMNs. Otherwise, if the UE 205 has no IP connectivity (e.g., the UE 205 is not connected via 3GPP access), then the UE 205 may use a cached DNS response that was received in the past, or may use local configuration that indicates which visited countries mandate a PLMN selection in the visited region/country.

If the UE 205 determines that it is not mandatory to select a PLMN in the visited region/country, and the HPLMN or an E-HPLMN is included in the list of available PLMNs, then the UE 205 selects the HPLMN or an E-HPLMN, whichever is included in the list of available PLMNs. Otherwise, the UE 205 selects a PLMN in the visited region/country by considering, in priority order, the PLMNs in the Operator Controlled PLMN Selector list (in Universal Subscriber Identity Module ("USIM")). The UE 205 selects the highest priority PLMN in the Operator Controlled PLMN Selector list that is also included in the list of available PLMNs. Note that if the list of available PLMNs does not include a PLMN that is also included in the Operator Controlled PLMN Selector list, then the UE 205 stops the procedure and may attempt to connect via untrusted non-3GPP access.

Moreover, the UE 205 selects the first S-NSSAI based on configuration information in the UE 205. For example, the UE 205 may be configured to prefer an S-NSSAI corresponding to a network slice suitable for massive IoT communication (e.g. with a Slice/Service Type=3, as defined in TS 23.501), or an S-NSSAI corresponding to a network slice suitable for ultra-reliable and low-latency communication (e.g. with a Slice/Service Type=2, as defined in TS 23.501). Note that the S-NSSAIs supported by the first PLMN may be provided in the list of supported PLMNs 724 (e.g., received in messaging 722, step 4*b*).

In step 7, the UE 205 selects a non-3GPP access network (e.g. an SSID) to connect to (see block 732). Non-3GPP access network selection may be as follows:

The UE 205 puts the available non-3GPP access networks in priority order. In case of WLAN access, the UE 205 may construct this prioritized list by using the WLANSP rules (if provisioned), or any other UE-implementation-specific means. Then, from the prioritized list of non-3GPP access networks, the UE 205 selects the highest priority non-3GPP access network that supports 5G connectivity-without-NAS to the first PLMN and with the first S-NSSAI.

In the example shown in FIGS. 2A-B, if the UE 205 selected PLMN-d in step 6, then the UE 205 would select the non-3GPP access network 2, if the UE 205 was configured to prefer S-NSSAI-z over S-NSSAI-w. Alternatively, the UE 205 would select the non-3GPP access network 3, if the UE 205 was configured to prefer S-NSSAI-w over S-NSSAI-z.

In Step 8, after the UE 205 completes the access network selection procedure, the UE 205 initiates the establishment of the desired data connection by sending a request message to the selected non-3GPP access network that contains the first PLMN and the first S-NSSAI (see messaging 734). In various embodiments, the UE 205 sends a request message to the selected SSID that contains the first PLMN and the first S-NSSAI, wherein the request message is sent for establishing a data connection to a DN via the first PLMN and the first S-NSSAI. Note that the S-NSSAI is composed of a Slice/Service Type and an optional Slice Differentiator. The first PLMN and the first S-NSSAI are contained in the NAI provided by the UE 205, e.g., "NAI=<username>@sdD16273.st03.snssai.mnc123.mcc45.3gppnetwork.org" (see messaging 734, step 8*d*). With this NAI, the UE 205 indicates it wants to connect to the PLMN with Mobile Country Code ("MCC")=45 and Mobile Network Code ("MNC")=123, and it wants to use a network slice in the PLMN with Slice/Service Type=03 and Slice Differentiator=D16273. In one example, the establishment procedure is initiated by using the Extensible Authentication Protocol ("EAP") protocol.

In Step 9, the TWAP 704 selects a TWIF 706 which supports the first PLMN and the first S-NSSAI provided by the UE 205 (see block 736). In this step the TWAP 704 utilizes the information received by one or more TWIFs (e.g., in messages 720).

In Step 10, the TWAP 704 sends an AAA Request message to the selected TWIF 706 indicating that a UE 205 wants to establish a data connection via a 5G PLMN without using the NAS protocol (see messaging 738). The TWIF 706 determines the first PLMN and the first S-NSSAI by examining the NAI provided by the UE 205 (see block 740).

In Step 11, the TWIF 706 selects an AMF (here, AMF 708) in the first PLMN and sends a NAS message to the AMF 708 that includes the first S-NSSAI and a PDU Session Establishment request (see messaging 742, step 11*a*). This NAS message indicates that a new PDU Session is required for a UE that does not support the NAS protocol.

Subsequently, signaling takes place between the UE 205, the TWIF 706, the AMF 708, the AUSF 714 and other network functions in 5GC (e.g., PCF 710 and UDM 712), which authenticates the UE 205 and establishes a PDU Session to be used by the UE 205 (see messaging 742, step 11*b*). During this step, the UE 205 does not exchange any NAS messages, but rather exchanges EAP messages, which are typically used for accessing a non-3GPP access network. Note that the AMF 708 may use the "default DNN for delegated PDU session" received earlier to determine the DN (e.g., for PDU session establishment).

In Step 12, the data connection (e.g., PDU Session) is finally established connecting the UE 205 with a Data Network (e.g., DN 250), via the selected non-3GPP access network and the first S-NSSAI in the first PLMN (see block 744). A UPF 716 in the network slice in the first PLMN that corresponds to the first S-NSSAI anchors the N3 tunnel. The access network selection procedure 700 ends.

Figure 8:
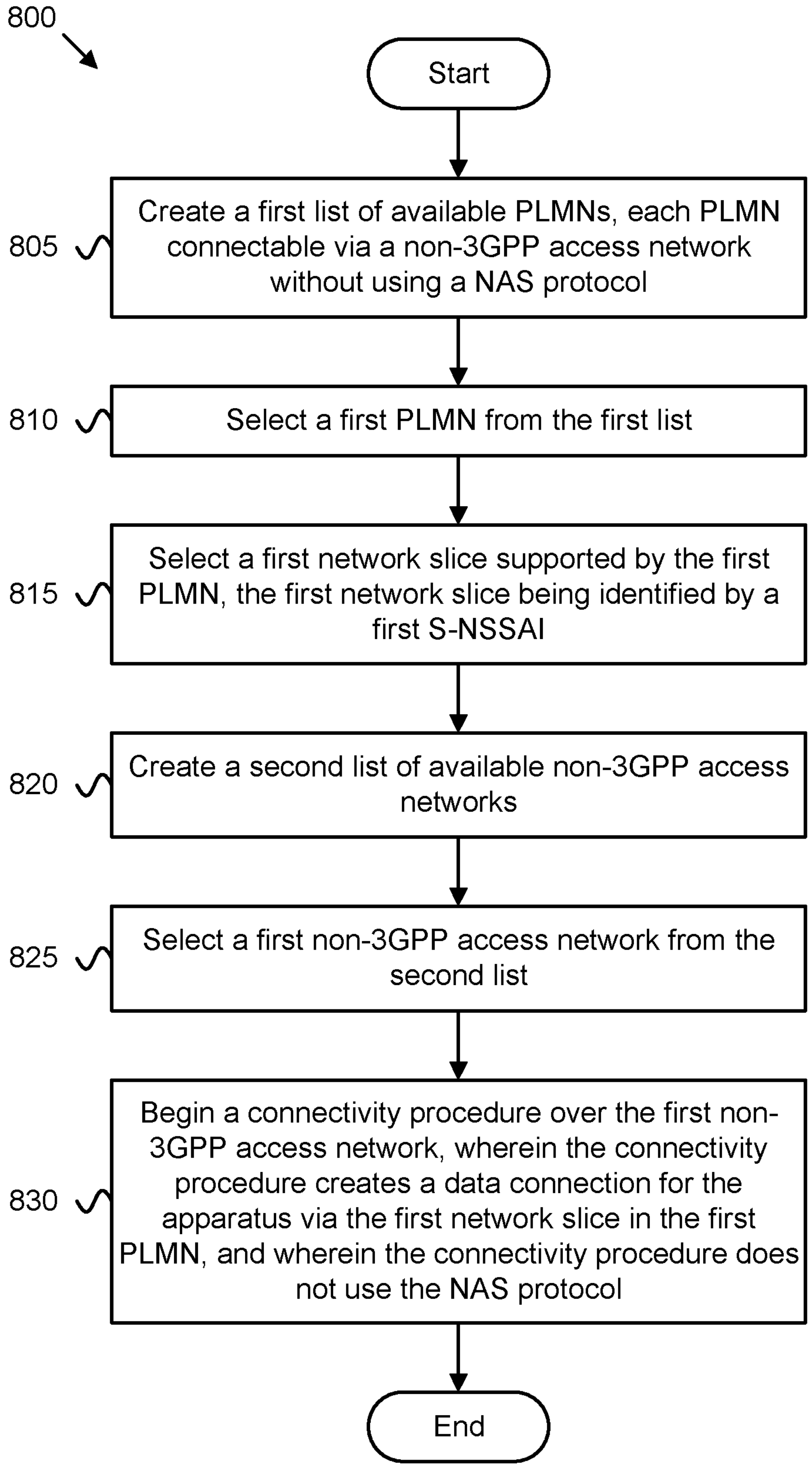
FIG. 8 illustrates a flowchart of a first method that supports techniques for access network selection for UEs not supporting the NAS protocol over non-3GPP access in accordance with aspects of the present disclosure.

FIG. 8 depicts a method 800 for access network selection for UEs not supporting the NAS protocol over non-3GPP access, in accordance with aspects of the present disclosure. In some embodiments, the method 800 is performed by an apparatus, such as the remote unit 105, the UE 205, and/or the user equipment apparatus 500. In certain embodiments, the method 800 may be performed by a processor executing program code, for example, a microcontroller, a microprocessor, a CPU, a GPU, an auxiliary processing unit, a FPGA, or the like.

The method 800 begins and creates 805 a first list of available PLMNs, each PLMN connectable via a non-3GPP access network without using the NAS protocol. The method 800 includes selecting 810 a first PLMN from the first list. Selecting 810 a first PLMN from the first list may be as described above with reference to FIGS. 7A-7B.

The method 800 includes selecting 815 a first network slice supported by the first PLMN. Here, the first network slice is identified by a S-NSSAI. Selecting 815 a first network slice supported by the first PLMN may be as described above with reference to FIGS. 7A-7B.

The method 800 includes creating 820 a second list of available non-3GPP access networks. The method 800 includes selecting 825 a first non-3GPP access network from the second list. Selecting 825 a first non-3GPP access network from the second list may be as described above with reference to FIGS. 7A-7B.

The method 800 includes beginning 830 a connectivity procedure over the first non-3GPP access network. Here, the connectivity procedure creates a data connection for the apparatus via the first network slice in the first PLMN. Moreover, the connectivity procedure does not use the NAS protocol. The method 800 ends.

Figure 9:
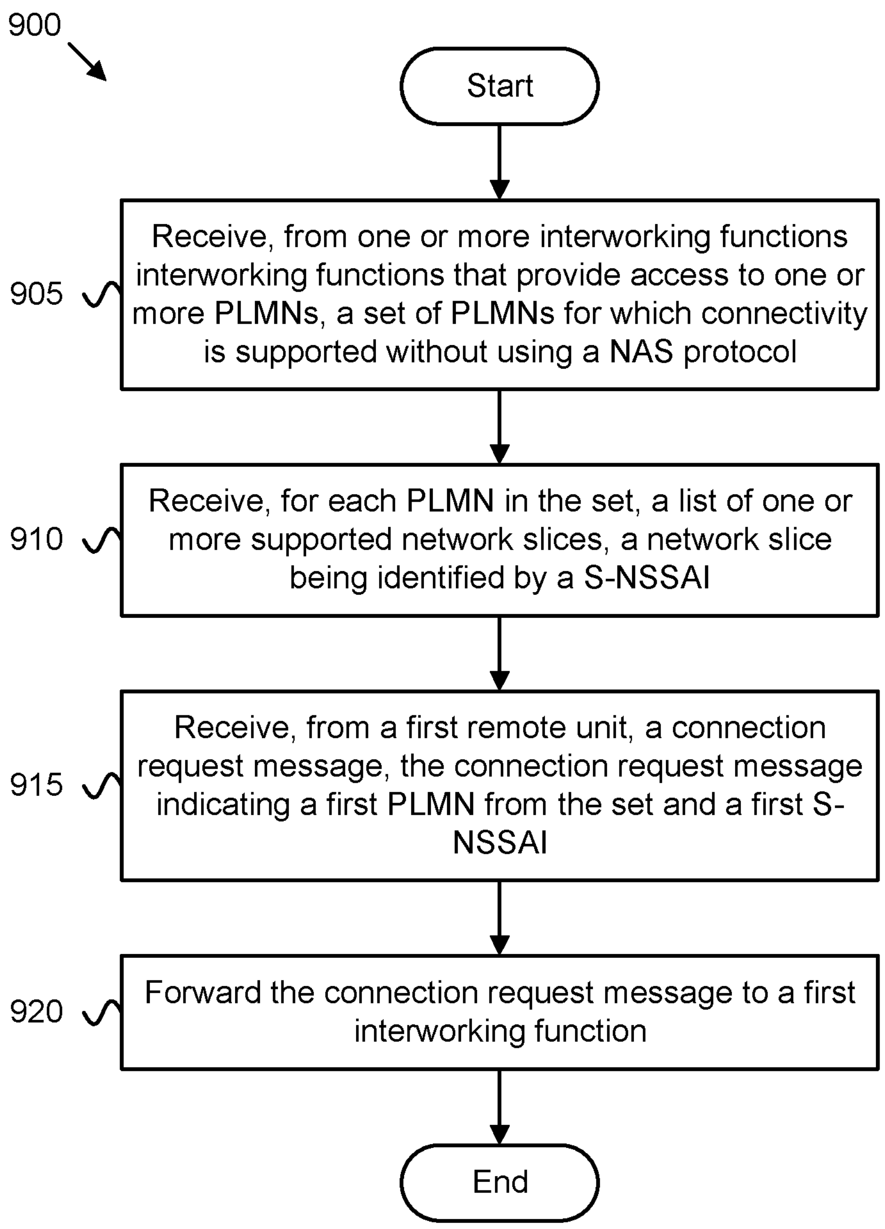
FIG. 9 illustrates a flowchart of a second method that supports techniques for access network selection for UEs not supporting the NAS protocol over non-3GPP access in accordance with aspects of the present disclosure.

FIG. 9 depicts a method 900 for access network selection for UEs not supporting the NAS protocol over non-3GPP access, in accordance with aspects of the present disclosure. In some embodiments, the method 900 is performed by an apparatus, such as the access point 131, the first TWAP 310, the second TWAP 315, the first FN-RG 410, the second FN-RG 415, the network equipment apparatus 600, and/or the TWAP 704. In certain embodiments, the method 900 may be performed by a processor executing program code, for example, a microcontroller, a microprocessor, a CPU, a GPU, an auxiliary processing unit, a FPGA, or the like.

The method 900 begins and receives 905 a set of PLMNs for which connectivity is supported without using the NAS protocol. The set of PLMNs is received from one or more interworking functions that provide access to one or more PLMNs.

The method 900 includes, for each PLMN in the set, receiving 910 a list of one or more supported network slices, a network slice being identified by a S-NSSAI.

The method 900 includes, from a first remote unit, receiving 915 a connection request message, the connection request message indicating a first PLMN from the set and a first S-NSSAI.

The method 900 includes forwarding 920 the connection request message to a first interworking function. The method 900 ends.

Disclosed herein is a first apparatus for access network selection for UEs not supporting the NAS protocol over non-3GPP access. In various embodiments, the first apparatus may be a user terminal, such as the remote unit 105, the UE 205, and/or the user equipment apparatus 500. The first apparatus includes a processor and a transceiver that communicates with one or more non-3GPP access networks. The processor creates a first list of available PLMNs, each PLMN connectable via a non-3GPP access network without using the NAS protocol. The processor selects a first PLMN from the first list and selects a first network slice supported by the first PLMN. Here, the first network slice is identified by a first S-NSSAI. The processor creates a second list of available non-3GPP access networks and selects a first non-3GPP access network from the second list. The processor begins a connectivity procedure over the first non-3GPP access network. Here, the connectivity procedure creates a data connection for the apparatus via the first network slice in the first PLMN. Moreover, the connectivity procedure does not use the NAS protocol.

In some embodiments, creating the first list of available PLMNs includes discovering a plurality of available non-3GPP access networks and determining, for each available non-3GPP access network, a set of PLMNs which are connectable without using the NAS protocol and one or more network slices supported by each PLMN in the set. In certain embodiments, determining the set of PLMNs which are connectable without using the NAS protocol and the one or more network slices supported by each PLMN in the set includes using an access network query protocol to acquire a list of PLMNs connectable via each available non-3GPP access network without using the NAS protocol and the network slices supported for each PLMN in the list of PLMNs connectable via each available non-3GPP access network without using the NAS protocol. In certain embodiments, the first non-3GPP access network is a highest priority available non-3GPP access network that supports connectivity to the first network slice in the first PLMN.

In some embodiments, beginning the connectivity procedure over the first non-3GPP access network includes sending a request message to the first non-3GPP access network that indicates the first PLMN and the first S-NSSAI. In certain embodiments, the request message includes NAI containing identifiers for the first PLMN and for the first S-NSSAI.

In some embodiments, creating the second list includes discovering a plurality of available non-3GPP access networks and ordering the plurality of available non-3GPP access networks into a prioritized list based on a set of WLANSP rules. In such embodiments, the second list may be ordered based on operating parameters of the plurality of available non-3GPP access networks.

In some embodiments of the first apparatus, the processor selects the first S-NSSAI using configuration information in the apparatus. In certain embodiments, beginning the connectivity procedure includes creating a data connection via the first network slice in the first PLMN and via one of: a TWIF in the first non-3GPP access network, and a FN-RG in the first non-3GPP access network.

Disclosed herein is a first method for access network selection for UEs not supporting the NAS protocol over non-3GPP access. In various embodiments, the first method may be implemented by a user terminal, such as the remote unit 105, the UE 205, and/or the user equipment apparatus 500. The first method includes creating a first list of available PLMNs, each PLMN connectable via a non-3GPP access network without using the NAS protocol. The first method includes selecting a first PLMN from the first list and selecting a first network slice supported by the first PLMN. Here, the first network slice is identified by a S-NSSAI. The first method includes creating a second list of available non-3GPP access networks and selecting a first non-3GPP access network from the second list. The first method includes beginning a connectivity procedure over the first non-3GPP access network. Here, the connectivity procedure creates a data connection for the apparatus via the first network slice in the first PLMN. Moreover, the connectivity procedure does not use the NAS protocol.

In some embodiments of the first method, creating the first list includes discovering a plurality of available non-3GPP access networks and determining, for each available non-3GPP access network, a set of PLMNs which are connectable without using the NAS protocol and one or more network slices supported by each PLMN in the set. In certain embodiments, the first non-3GPP access network is a highest priority available non-3GPP access network that supports connectivity to the first network slice in the first PLMN. In certain embodiments, determining the set of PLMNs which are connectable without using the NAS protocol and the one or more network slices supported by each PLMN in the set includes using an access network query protocol to acquire a list of PLMNs connectable via each available non-3GPP access network without using the NAS protocol and the network slices supported for each PLMN in the list of PLMNs connectable via each available non-3GPP access network without using the NAS protocol.

In certain embodiments of the first method, beginning the connectivity procedure over the first non-3GPP access network includes sending a request message to the first non-3GPP access network that indicates the first PLMN and the first S-NSSAI. In certain embodiments, the request message includes a NAI containing identifiers for the first PLMN and for the first S-NSSAI. In some embodiments of the first method, creating the second list includes discovering a plurality of available non-3GPP access networks and ordering the plurality of available non-3GPP access networks into a prioritized list based on a set of WLANSP rules. In such embodiments, the second list may be ordered based on operating parameters of the plurality of available non-3GPP access networks.

In some embodiments of the first method, selecting the first S-NSSAI is based on configuration information in the apparatus. In some embodiments of the first method, beginning the connectivity procedure includes creating a data connection via the first network slice in the first PLMN via one of: a TWIF in the first non-3GPP access network, and a FN-RG in the first non-3GPP access network.

Disclosed herein is a second apparatus for access network selection for UEs not supporting the NAS protocol over non-3GPP access. In various embodiments, the second apparatus may be an access point of a non-3GPP access network, such as the access point 131, the first TWAP 310, the second TWAP 315, the first FN-RG 410, the second FN-RG 415, the network equipment apparatus 600, and/or the TWAP 704. The second apparatus includes a processor and a transceiver that communicates with one or more remote units and with one or more interworking functions that provide access to one or more PLMNs. The processor receives, from one or more interworking functions, a set of PLMNs for which connectivity is supported without using the NAS protocol.

The processor receives, for each PLMN in the set, a list of one or more supported network slices, a network slice being identified by a S-NSSAI. The processor receives, from a first remote unit, a connection request message, the connection request message indicating a first PLMN from the set and a first S-NSSAI. The processor forwards the connection request message to a first interworking function.

In some embodiments, the processor further selects the first interworking function based on the first PLMN and the first S-NSSAI. In certain embodiments, the connection request message includes a NAI containing identifiers for the first PLMN and for the first S-NSSAI.

Disclosed herein is a second method for access network selection for UEs not supporting the NAS protocol over non-3GPP access. In various embodiments, the second method may be implemented by an access point of a non-3GPP access network, such as the access point 131, the first TWAP 310, the second TWAP 315, the first FN-RG 410, the second FN-RG 415, the network equipment apparatus 600, and/or the TWAP 704. The second method includes receiving, from one or more interworking functions, a set of PLMNs for which connectivity is supported without using the NAS protocol. Here, the one or more interworking functions provide access to one or more PLMNs.

The second method includes receiving, for each PLMN in the set, a list of one or more supported network slices, a network slice being identified by a S-NSSAI. The second method includes receiving, from a first remote unit, a connection request message, the connection request message indicating a first PLMN from the set and a first S-NSSAI. The second method includes forwarding the connection request message to a first interworking function.

In some embodiments, the second method further includes selecting the first interworking function based on the first PLMN and the first S-NSSAI. In certain embodiments, the connection request message includes a NAI containing identifiers for the first PLMN and for the first S-NSSAI.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a RAM, a read-only memory ("ROM"), an erasable programmable read-only memory ("EPROM") (or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store, a program for use by or in connection with an instruction execution system, apparatus, or device.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described above with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams.

The code may also be loaded onto a computer, other programmable data processing apparatus, or other devices to cause a series of operational steps to be performed on the computer, other programmable apparatus, or other devices to produce a computer implemented process such that the code which execute on the computer or other programmable apparatus provide processes for implementing the functions/acts specified in the schematic flowchart diagrams and/or schematic block diagram.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

The description of elements in each figure may refer to elements of proceeding figures. Like numbers refer to like elements in all figures, including alternate embodiments of like elements.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A user equipment ("UE") for wireless communication, comprising:
- at least one memory; and
- at least one processor coupled with the at least one memory and configured to cause the UE to:
  - create a first list of available public land mobile networks ("PLMNs"), each PLMN connectable via a wireless local area network ("WLAN") access network using a fifth generation ("5G") connectivity without a non-access stratum ("NAS") protocol;
  - select a PLMN from the first list;
  - create a second list of available WLAN access networks;
  - select a WLAN access network from the second list; and
    - initiate a connectivity procedure over the selected WLAN access network,
      - wherein the connectivity procedure establishes a data connection for the UE via the selected PLMN, and wherein the connectivity procedure does not use the NAS protocol.

2. The UE of claim 1, wherein to create the first list of available PLMNs, the at least one processor is configured to cause the UE to:
- discover a plurality of available WLAN access networks; and
- determine, for each WLAN access network of the plurality of WLAN access networks, a set of PLMNs which are connectable using the 5G connectivity without the NAS protocol.

3. The UE of claim 2, wherein to determine the set of PLMNs, the at least one processor is configured to cause the UE to:
- transmit an access network query protocol ("ANQP") to each WLAN access network of the plurality of WLAN access networks; and
- receive one or more ANQP responses, wherein each ANQP response comprises a list of PLMNs connectable via a responding WLAN access network.

4. The UE of claim 2, wherein the at least one processor is configured to cause the UE to determine one or more network slices supported by each PLMN in the set of PLMNs.

5. The UE of claim 2, wherein to select the WLAN access network, the at least one processor is configured to cause the UE to select a highest priority available WLAN access network that supports connectivity to the selected PLMN.

6. The UE of claim 1, wherein to initiate the connectivity procedure over the selected WLAN access network, the at least one processor is configured to cause the UE to transmit, to the selected WLAN access network, a request message comprising a network access identifier ("NAI"), wherein the NAI comprises an identifier for the selected PLMN.

7. The UE of claim 6, wherein the NAI further comprises an identifier for a first single network slice selection assistance information ("S-NSSAI"), and wherein the connectivity procedure establishes a data connection via a network slice, in the selected PLMN, corresponding the first S-NSSAI.

8. The UE of claim 1, wherein to create the second list, the at least one processor is configured to cause the UE to:
- discover a plurality of available WLAN access networks; and
- order the plurality of available WLAN access networks into a prioritized list based on a set of wireless local area network selection policy ("WLANSP") rules.

9. The UE of claim 8, wherein the plurality of available WLAN access networks are ordered based on operating parameters of the plurality of available WLAN access networks.

10. The UE of claim 1, wherein to initiate the connectivity procedure, the at least one processor is configured to cause the UE to establish the data connection via one of:
- a trusted wireless local area network interworking function ("TWIF") in the selected WLAN access network, or
- a fixed network residential gateway ("FN-RG") in the selected WLAN access network.

11. A method performed by a user equipment ("UE"), the method comprising:
- creating a first list of available public land mobile networks ("PLMNs"), each PLMN connectable via a wireless local area network ("WLAN") access network using a fifth generation ("5G") connectivity without a non-access stratum ("NAS") protocol;
- selecting a PLMN from the first list;
- creating a second list of available WLAN access networks;
- selecting a selected WLAN access network from the second list; and
- initiating a connectivity procedure over the selected WLAN access network, wherein the connectivity procedure establishes a data connection for the UE via the selected PLMN, and wherein the connectivity procedure does not use the NAS protocol.

12. The method of claim 11, wherein creating the first list comprises:
- discovering a plurality of available WLAN access networks; and
- determining, for each available WLAN access network, a set of PLMNs which are connectable using the 5G connectivity without the NAS protocol.

13. The method of claim 12, wherein determining the set of PLMNs comprises:
- transmitting an access network query protocol ("ANQP") to each WLAN access network of the plurality of WLAN access networks; and
- receiving one or more ANQP responses, wherein each ANQP response comprises a list of PLMNs connectable via a responding WLAN access network.

14. The method of claim 12, further comprising determining one or more network slices supported by each PLMN in the set of PLMNs.

15. The method of claim 12, selecting the WLAN access network comprises selecting a highest priority available WLAN access network that supports connectivity to the selected PLMN.

16. The method of claim 11, wherein initiating the connectivity procedure over the selected WLAN access network comprises transmitting, to the selected WLAN access network, a request message comprising a network access identifier ("NAI"), wherein the NAI comprises an identifier for the selected PLMN.

17. The method of claim 16, wherein the NAI further comprises an identifier for a single network slice selection assistance information ("S-NSSAI"), and wherein the connectivity procedure establishes a data connection via a network slice, in the selected PLMN, corresponding the S-NSSAI.

18. The method of claim 11, wherein creating the second list comprises:

discovering a plurality of available WLAN access networks; and ordering the plurality of available WLAN access networks into a prioritized list based on a set of wireless local area network selection policy ("WLANSP") rules.

19. The method of claim 18, wherein the plurality of available WLAN access networks are ordered based on operating parameters of the plurality of available WLAN access networks.

20. The method of claim 11, wherein initiating the connectivity procedure comprises establishing the data connection via one of:

a trusted wireless local area network interworking function ("TWIF") in the selected WLAN access network, or a fixed network residential gateway ("FN-RG") in the selected WLAN access network.

* * * * *